US006812320B2

(12) United States Patent
Silva et al.

(10) Patent No.: US 6,812,320 B2
(45) Date of Patent: Nov. 2, 2004

(54) METHOD FOR COPOLYESTERCARBONATE SYNTHESIS

(75) Inventors: James Manio Silva, Clifton Park, NY (US); David Michel Dardaris, Ballston Spa, NY (US); Gregory Allen O'Neil, Clifton Park, NY (US); Paul Dean Sybert, Evansville, IN (US); Zhaohui Su, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/105,565

(22) Filed: Mar. 25, 2002

(65) Prior Publication Data

US 2003/0195325 A1 Oct. 16, 2003

(51) Int. Cl.[7] .............................................. C08G 64/00
(52) U.S. Cl. ...................... 528/198; 525/461; 525/462; 528/176; 528/193; 528/194; 528/196; 528/271; 528/272
(58) Field of Search ................................ 528/176, 193, 528/194, 196, 198, 271, 272; 525/461, 462

(56) References Cited

U.S. PATENT DOCUMENTS

| | | | |
|---|---|---|---|
| 3,030,331 A | 4/1962 | Goldberg | |
| 3,169,121 A | 2/1965 | Goldberg | |
| 3,207,814 A | 9/1965 | Goldberg | |
| 3,939,117 A | 2/1976 | Ueno | |
| 4,156,069 A | 5/1979 | Prevorsek et al. | |
| 4,194,038 A | 3/1980 | Baker et al. | |
| 4,217,438 A | 8/1980 | Brunelle et al. | |
| 4,238,596 A | 12/1980 | Quinn | |
| 4,238,597 A | 12/1980 | Markezich et al. | |
| 4,281,099 A | 7/1981 | Maresca | |
| 4,286,083 A | 8/1981 | Kochanowski | |
| 4,334,053 A | 6/1982 | Freitag et al. | |
| 4,482,694 A | 11/1984 | Freitag et al. | |
| 4,487,896 A | 12/1984 | Mark et al. | |
| 4,495,325 A | 1/1985 | DeBergalis et al. | |
| 4,506,065 A | 3/1985 | Miller et al. | |
| 4,617,368 A | 10/1986 | Freitag et al. | |
| 4,973,652 A | 11/1990 | Ebert et al. | |
| 5,036,150 A | 7/1991 | Kawakami et al. | |
| 5,321,114 A | 6/1994 | Fontana et al. | |
| 5,714,567 A | 2/1998 | Idage et al. | |
| 5,807,965 A | 9/1998 | Davis | |
| 5,821,322 A | 10/1998 | Brunelle et al. | |
| 5,916,997 A | 6/1999 | Webb et al. | |
| 5,973,103 A | 10/1999 | Silva et al. | |
| 6,265,522 B1 | 7/2001 | Brunelle et al. | |
| 6,291,589 B1 | 9/2001 | Brunelle et al. | |
| 6,294,647 B1 | 9/2001 | Brunelle et al. | |
| 6,306,507 B1 | 10/2001 | Brunelle et al. | |
| 6,307,005 B1 | 10/2001 | Davis et al. | |
| 2002/0156229 A1 * | 10/2002 | Silva et al. | |

FOREIGN PATENT DOCUMENTS

| | | |
|---|---|---|
| DE | 1927938 | 12/1970 |
| JP | 133332 | 10/1981 |
| JP | 1 199841 | 8/1989 |
| JP | 1 201326 | 8/1989 |
| JP | 6-122756 | 5/1994 |
| RU | 2001051 | 10/1993 |
| WO | WO 00/26274 | 5/2000 |
| WO | WO 00/26275 | 5/2000 |

OTHER PUBLICATIONS

Application Ser. No. 09/683,017 filed Nov. 8, 2001.
Application Ser. No. 09/916,160 filed Jul. 26, 2001.
International Search Report for Application No. PCT/US 03/07203 Jun. 17, 2003.
International Search Report, International Application No. PCT/US03/07203, International Filing Date: Mar. 11, 2003, Jun. 17, 2003, 7 pgs.
RU 2001 051 C (Autotractors Materials Res), Oct. 15, 1993, 3 pages.
International Search Report, International Application No. PCT/US03/07203, International Filing Date: Nov. 3, 2003, Date of Mailing: Jun. 17, 2003, 7 pgs.
RU 2 001 051 C (Autotractors Materials Res), Oct. 15, 1993, 3 pages.

* cited by examiner

Primary Examiner—Terressa M. Boykin
(74) Attorney, Agent, or Firm—Cantor Colburn LLP

(57) ABSTRACT

Thermally stable block copolyestercarbonates comprising chain members derived from at least one dihydroxy-substituted aromatic hydrocarbon moiety and at least one aromatic dicarboxylic acid moiety, said polymer being substantially free of anhydride linkages linking at least two mers of the polyester chain segments, are prepared by a method comprising the steps of: (a) preparing a hydroxy-terminated polyester intermediate comprising structural units derived from at least one dihydroxy-substituted aromatic hydrocarbon moiety and at least one aromatic dicarboxylic acid moiety; and (b) conducting a reaction of the polyester intermediate with phosgene in a reaction mixture comprising water, a substantially water-immiscible organic solvent, and a base, wherein base and phosgene are added simultaneously to the reaction mixture at a substantially constant molar ratio of base to phosgene for a time period of at least about 60% of the total amount of phosgene added.

95 Claims, 2 Drawing Sheets

METHOD FOR COPOLYESTERCARBONATE SYNTHESIS

BACKGROUND OF THE INVENTION

This invention relates to a method for preparing a copolyestercarbonate comprising at least one carbonate block and at least one polyester block with chain members derived from at least one dihydroxy-substituted aromatic hydrocarbon moiety and at least one aromatic dicarboxylic acid moiety (sometimes referred to hereinafter as arylate chain members). In a particular embodiment the invention relates to a method for preparing a copolyestercarbonate comprising at least one carbonate block and at least one polyester block with chain members derived from at least one 1,3-dihydroxybenzene moiety and at least one aromatic dicarboxylic acid moiety (sometimes referred to hereinafter as resorcinol arylate chain members).

Various resinous articles comprising polymers have a problem of long term color instability. In many cases this instability is seen as yellowing of the polymer, detracting from the article's attractiveness and also transparency when the polymer was initially transparent. Loss of gloss can also be an undesirable long term phenomenon in a resinous article.

Yellowing of polymers is often caused by the action of ultraviolet radiation, and such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds, which must be employed at relatively low levels, typically up to 1% by weight, to avoid degradation of the physical properties of the polymer such as impact strength and high temperature properties as reflected in heat distortion temperature. Another problem of concern with polymers such as aromatic polycarbonates and addition polymers of alkenylaromatic compounds such as styrene is susceptibility to attack by organic liquids.

One way of protecting a resinous article against photoyellowing and loss of gloss is to apply a coating of a weatherable second polymer, the term "weatherable" as used herein signifying resistance to such phenomena. Coatings made from polyesters containing resorcinol arylate chain members often possess good weatherability properties. The arylate moieties typically contain isophthalate, terephthalate, and especially mixtures of iso- and terephthalate units.

The good weatherability properties of polyesters containing resorcinol arylate chain members are believed to arise in large part from the screening effect said chain members may provide to ultraviolet (UV) light. On exposure to UV light polymers comprising resorcinol arylate chain members may undergo photochemical Fries rearrangement converting at least a portion of said chain members from polyester-type chain members to o-hydroxybenzophenone-type chain members. The o-hydroxybenzophenone-type chain members act to screen further UV light and protect UV-sensitive components in a resorcinol arylate-containing composition. The good weatherability properties of polymers comprising resorcinol arylate chain members make them especially useful in blends and in multilayer articles in which said polymers may act as a protecting layer for more sensitive substrate components.

Copolyestercarbonates often possess property advantages compared to their parent polyester or polycarbonate comprising chain members similar to the corresponding blocks in the copolymer. For example, copolyestercarbonates derived from combination of resorcinol with mixtures of isophthalate and terephthalate chain members may have good weatherability properties and may provide protection against photoyellowing when coated over a resinous substrate. Methods for preparation of copolyestercarbonates are disclosed in, for example, U.S. Pat. Nos. 3,030,331; 3,169,121; 3,207,814; 4,194,038; 4,156,069; 4,238,596; 4,238,597; 4,286,083; 4,487,896; 4,506,065; 5,321,114; and 5,807,965. Block copolyestercarbonates comprising resorcinol arylate chain members in combination with carbonate chain members are disclosed in published PCT Application WO 00/26275. These copolymers have excellent weatherability and are compatible with polycarbonates in blends. In one embodiment these block copolyestercarbonates are prepared by a method which comprises the steps of: (A) preparing a hydroxy-terminated polyester intermediate having a degree of polymerization of at least 4 by the reaction of at least one 1,3-dihydroxybenzene moiety with at least one aromatic dicarboxylic acid dichloride; and (B) conducting a reaction of said polyester intermediate with a carbonate precursor. The polyester intermediate is synthesized by an interfacial method employing in one embodiment unsubstituted resorcinol, isophthaloyl dichloride, terephthaloyl dichloride, water and dichloromethane, which is often the organic solvent of choice. The hydroxy-terminated polyester intermediate comprises phenolic hydroxy end-groups suitable for growing polycarbonate chains in a subsequent reaction step with a carbonate precursor, and optional second dihydroxy-containing compound.

Brunelle et al. in U.S. Pat. No. 6,265,522 teach that the phosgenation step of an interfacial copolyestercarbonate synthesis process can be conducted at an initial pH target of 7.5–8.5, followed by increasing the pH target slowly to 10–10.5. Typically, a total of 15% excess phosgene is added over the stoichiometric amount. This approach requires careful monitoring of the reaction pH. However, in interfacial synthesis, the reading obtained on a pH electrode often deviates (toward pH 7) by one or more pH units from the pH read by indicator paper, which is generally a more accurate indication of the actual pH. Erroneous or unreliable pH electrode readings make it impractical to conduct this type of caustic addition on a commercial scale.

Silva et al. in U.S. Pat. No. 5,973,103 teach a method for preparation of polycarbonate homopolymer in which aqueous caustic is added at a rate that is in a fixed ratio to the phosgene rate. The ratio of caustic to phosgene can be up to 1.8 mole/mole. One objective of this method was to make chloroformate-terminated oligomers of a specific molecular weight in the first stage of a two-stage polymerization process. This was accomplished by permitting only partial conversion of the phosgene through limited caustic addition. The current invention is outside the scope of this teaching.

It remains of interest, therefore, to develop a method for preparing copolyestercarbonates, said method to proceed under controlled conditions of base addition with minimal dependence on pH electrode accuracy. There is also a need to develop a method for preparing copolyestercarbonates while minimizing phosgene usage.

BRIEF SUMMARY OF THE INVENTION

In one of its aspects the present invention provides a method for preparing a block copolyestercarbonate comprising chain members derived from at least one dihydroxy-substituted aromatic hydrocarbon moiety and at least one aromatic dicarboxylic acid moiety, said polymer being substantially free of anhydride linkages linking at least two mers of the polyester chain segments, comprising the steps of:

(a) preparing a hydroxy-terminated polyester intermediate comprising structural units derived from at least one dihydroxy-substituted aromatic hydrocarbon moiety and at least one aromatic dicarboxylic acid moiety; and (b) conducting a reaction of the polyester intermediate with phosgene in a reaction mixture comprising water, a substantially water-immiscible organic solvent, and a base, wherein base and phosgene are added simultaneously to the reaction mixture at a substantially constant molar ratio of base to phosgene for a time period of at least about 60% of the total amount of phosgene added.

DETAILED DESCRIPTION OF THE INVENTION

Figure 1:
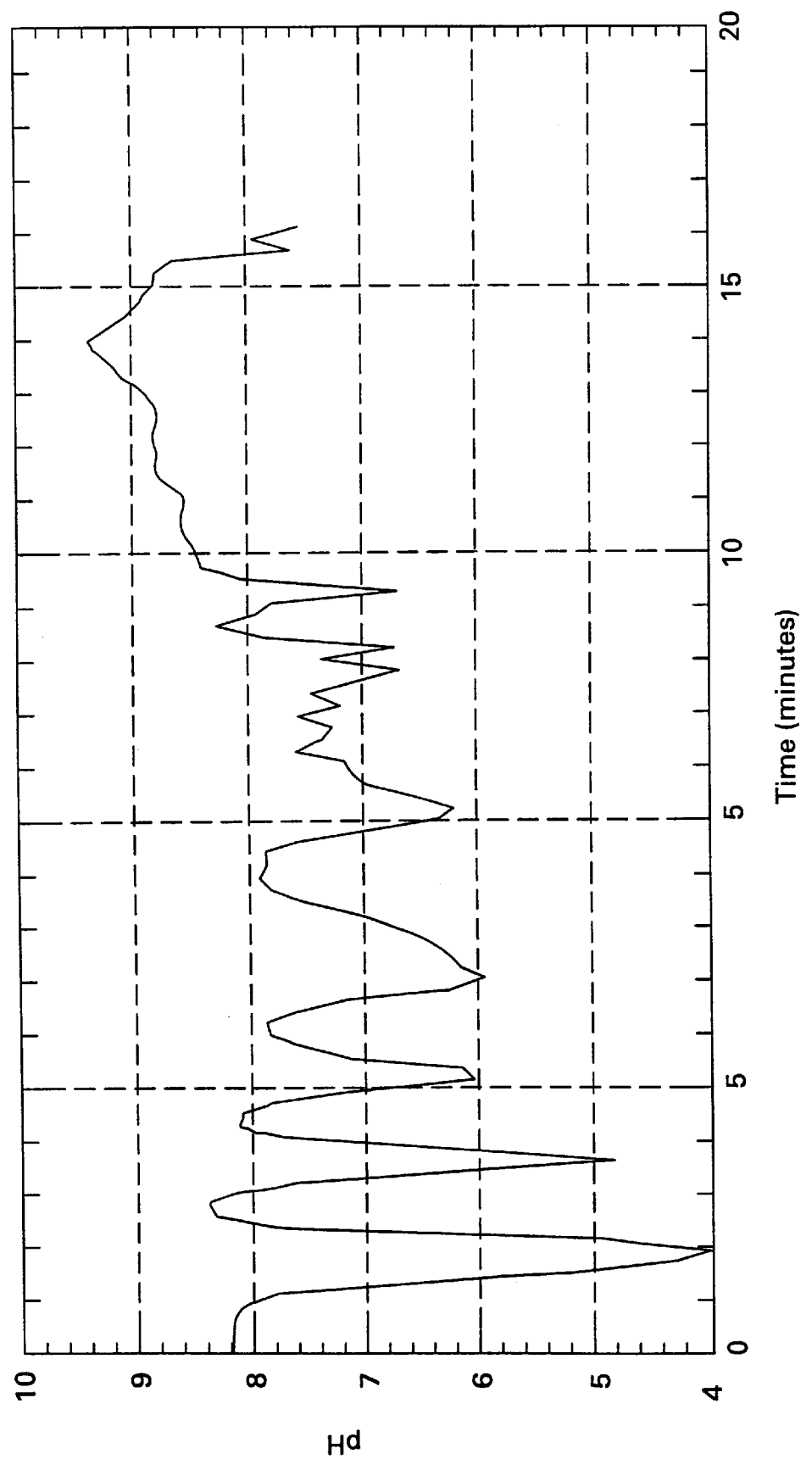
FIG. 1 shows a graph of measured pH versus time for a phosgenation reaction in which aqueous base was added in response to pH measurement.

In one embodiment the present invention comprises a method for preparing copolyestercarbonates comprising at least one carbonate block and at least one polyester block with chain members derived from at least one dihydroxy-substituted aromatic hydrocarbon moiety and at least one aromatic dicarboxylic acid moiety. In another embodiment the present invention comprises a method for preparing copolyestercarbonates comprising at least one carbonate block and at least one polyester block with chain members derived from at least one 1,3-dihydroxybenzene moiety and at least one aromatic dicarboxylic acid moiety. In various embodiments the copolyestercarbonates are thermally stable. Thermal stability within the context of the present invention refers to resistance of a polymer to molecular weight degradation under thermal conditions. Thus, a polymer with poor thermal stability shows significant molecular weight degradation under thermal conditions, such as during extrusion, molding, thermoforming, hot-pressing, and like conditions. Molecular weight degradation may also be manifested through color formation and/or in the degradation of other properties such as weatherability, gloss, mechanical properties, and/or thermal properties. Molecular weight degradation can also cause significant variation in processing conditions as the melt viscosity of the polymer changes.

In one of its aspects the method of the present invention provides thermally stable copolyestercarbonates comprising arylate polyester chain members. Said chain members comprise at least one dihydroxy-substituted aromatic hydrocarbon moiety in combination with at least one aromatic dicarboxylic acid moiety. In one particular embodiment the dihydroxy-substituted aromatic hydrocarbon moiety is derived from a 1,3-dihydroxybenzene moiety, illustrated in the structural moiety of formula (I), commonly referred to throughout this specification as resorcinol or resorcinol moiety. In formula (I) R is at least one of $C_{1-12}$ alkyl or halogen, and n is 0–3. Resorcinol or resorcinol moiety as used within the context of the present invention should be understood to include both unsubstituted 1,3-dihydroxybenzene and substituted 1,3-dihydroxybenzenes unless explicitly stated otherwise.

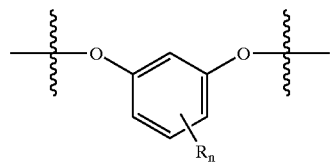

Formula (I)

Suitable dicarboxylic acid residues include aromatic dicarboxylic acid residues derived from monocyclic moieties, including isophthalic acid, terephthalic acid, or mixtures of isophthalic and terephthalic acids, or from polycyclic moieties. In various embodiments the aromatic dicarboxylic acid residues are derived from mixtures of isophthalic and terephthalic acids as typically illustrated in the structural moiety of formula (II).

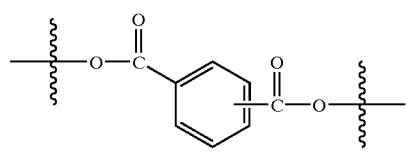

Formula (II)

Therefore, in one particular embodiment the present invention provides thermally stable copolyestercarbonates comprising resorcinol arylate polyester chain members as typically illustrated in the structural moiety of formula (III) wherein R and n are as previously defined:

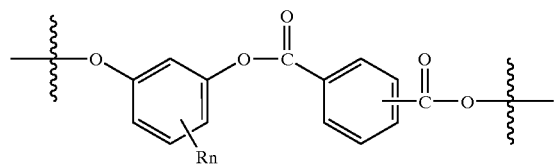

Formula (III)

In some embodiments block copolyestercarbonates of the invention are prepared by a method which comprises a first step of preparing a hydroxy-terminated polyester intermediate by an interfacial method in a reaction mixture comprising water and at least one organic solvent substantially immiscible with water. Previous interfacial methods for preparing polyester intermediates typically provide polymers with poor thermal stability and uncontrolled molecular weight. The present inventors have discovered that a primary reason for poor thermal stability is the presence of anhydride linkages in the polyester chain segments. One particular example of an anhydride linkage is illustrated in the structural moiety of formula (IV), wherein R and n are as previously defined. Such anhydride linkages link at least two mers in a polyester chain segment and may arise through combination of two isophthalate or terephthalate moieties or mixtures thereof. Although isophthalate and/or terephthalate are shown in formula (IV), it is to be understood that anhydride linkages in copolyestercarbonates may arise through combination of any suitable similar dicarboxylic acid residues or mixtures of suitable dissimilar dicarboxylic acid residues present in a reaction mixture. Also, it is to be understood that the depiction of a resorcinol-derived moiety in formula (IV) is illustrative and that some other dihydroxy-substituted aromatic hydrocarbon moiety could be present in addition to or in place of the depicted resorcinol-derived moiety.

Formula (IV)

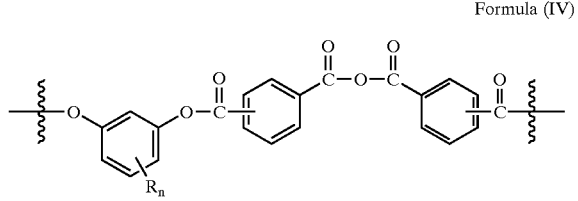

Although the invention is not limited by theory, it is believed that the anhydride linkage represents a weak bond in the polyester chain, which can break under thermal processing conditions to produce shorter chains terminated by acid end-groups. These acid end-groups, in turn, may accelerate the hydrolysis of the arylate moiety, generating additional carboxyl and hydroxyl end-groups, and further contributing to the molecular weight degradation, and loss in other desirable properties. Anhydride linkages may arise through several mechanisms. In one mechanism a carboxylic acid chloride may be hydrolyzed to carboxylic acid when the esterification reaction is run at high pH. The carboxylic acid or corresponding carboxylate may then react with another carboxylic acid chloride to yield an anhydride linkage.

Anhydride linkages may be detected by means known to those skilled in the art such as by $^{13}C$ nuclear magnetic resonance spectroscopy (NMR). For example, resorcinol arylate polyesters comprising dicarboxylic acid residues derived from a mixture of iso- and terephthalic acids typically show $^{13}C$ NMR resonances attributed to anhydride at 161.0 and 161.1 ppm (in deuterochloroform relative to tetramethylsilane), as well as resonances for the polymer carboxylic acid and hydroxyl end-groups. After thermal processing (for example, extrusion and/or molding), the polymer molecular weight decreases, and the anhydride resonances typically decrease, while those of the acid and hydroxyl end-groups typically increase.

Anhydride linkages, for example in polymers comprising resorcinol arylate polyester chain members, may also be detected by reaction of polymer with a nucleophile, such as a secondary amine. For example, a polymer sample can be dissolved in a convenient solvent, such as dichloromethane, and treated with a secondary amine, such as dibutylamine or diisobutylamine, for several minutes at ambient temperature. Comparison of the starting polymer molecular weight to that after amine treatment typically shows a decrease in molecular weight which can be correlated with the corresponding decrease observed under typical thermal processing conditions. Although the invention is not meant to be limited by theory, it is believed that nucleophiles, such as secondary amine and phenolic, attack anhydride linkages (as opposed to ester linkages) selectively under the reaction conditions. The decrease in molecular weight upon reaction with amine nucleophile is therefore an indication of the presence of anhydride functionality in the polymer.

Suitable dihydroxy-substituted aromatic hydrocarbons for preparing hydroxy-terminated polyester intermediates include those represented by the formula (V):

HO—D—OH    (V)

wherein D is a divalent aromatic radical. In some embodiments D has the structure of formula (VI);

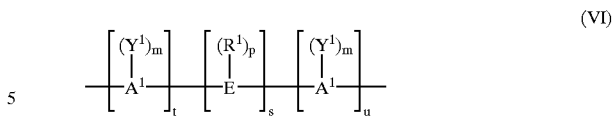

wherein $A^1$ represents an aromatic group such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. Where E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group (e.g., cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR; it being only necessary that $Y^1$ be inert to and unaffected by the reactants and reaction conditions used to prepare the copolyestercarbonate. The letter "m" represents any integer from and including zero through the number of positions on $A_1$ available for substitution; "p" represents an integer from and including zero through the number of positions on E available for substitution; "t" represents an integer equal to at least one; "s" is either zero or one; and "u" represents any integer including zero.

In the dihydroxy-substituted aromatic hydrocarbon compound in which D is represented by formula (VI) above, when more than one Y substituent is present, they may be the same or different. The same holds true for the $R^1$ substituent. Where "s" is zero in formula (VI) and "u" is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" are each one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

Some illustrative, non-limiting examples of dihydroxy-substituted aromatic hydrocarbons of formula (V) include the dihydroxy-substituted aromatic hydrocarbons disclosed by name or formula (generic or specific) in U.S. Pat. No. 4,217,438. Some particular examples of dihydroxy-substituted aromatic hydrocarbons include 4,4'-(3,3,5- trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxynaphthalene; hydroquinone; resorcinol; $C_{1-3}$ alkyl-substituted resorcinols.

Suitable dihydroxy-substituted aromatic hydrocarbons also include those containing indane structural units such as represented by the formula (VII), which compound is 3-(4-hydroxyphenyl)-1,1,3-trimethylindan-5-ol, and by the formula (VIII), which compound is 1-(4-hydroxyphenyl)-1,3,3-trimethylindan-5-ol:

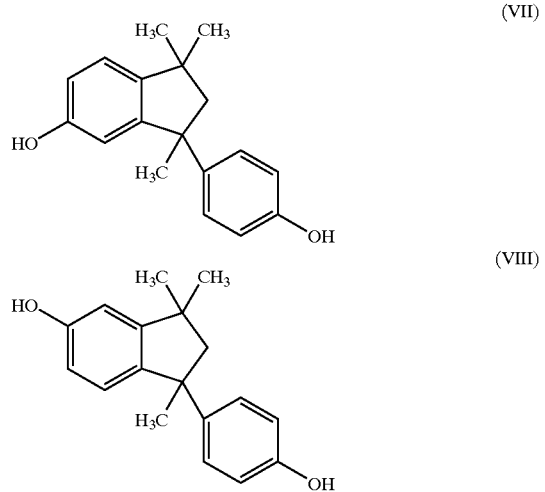

(VII)

(VIII)

Also included among suitable dihydroxy-substituted aromatic hydrocarbons are the 2,2,2',2'-tetrahydro-1,1'-spirobi[1H-indene]diols having formula (IX):

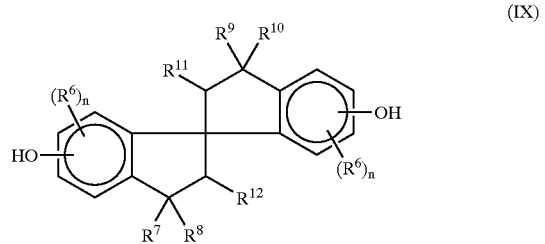

(IX)

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]-6,6'-diol (sometimes known as "SBI").

The term "alkyl" as used in the various embodiments of the present invention is intended to designate both normal alkyl, branched alkyl, aralkyl, cycloalkyl, and bicycloalkyl radicals. In various embodiments normal and branched alkyl radicals are those containing from 1 to about 12 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments cycloalkyl radicals are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those containing from 6 to 18 ring carbon atoms. Some illustrative non-limiting examples of these aryl radicals include phenyl, biphenyl, and naphthyl.

In the preparation of copolyestercarbonates the dihydroxy-substituted aromatic hydrocarbons described above may be used alone or as mixtures of two or more different dihydroxy-substituted aromatic hydrocarbons. In one particular embodiment a suitable dihydroxy-substituted aromatic hydrocarbon for the preparation of a copolyestercarbonate is 2,2-bis(4-hydroxyphenyl)propane (commonly known as bisphenol A or "BPA").

In another particular embodiment the dihydroxy-substituted aromatic hydrocarbon is a resorcinol moiety. Suitable resorcinol moieties for use in the method of the invention comprise units of formula (X):

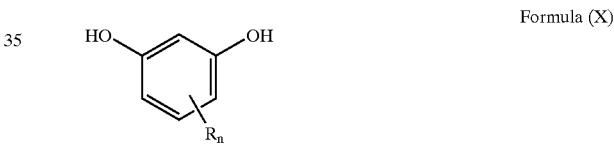

Formula (X)

wherein R is at least one of $C_{1-12}$ alkyl or halogen, and n is 0–3. Alkyl groups, if present, are in various embodiments straight-chain, branched or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, nonyl, decyl, dodecyl and aryl-substituted alkyl, including benzyl. In a particular embodiment a suitable alkyl group is methyl. Suitable halogen groups include bromo, chloro, and fluoro. 1,3-Dihydroxybenzene moieties containing a mixture of alkyl and halogen substituents are also suitable in some embodiments. The value for n may be in one embodiment in a range of between 0 and 3, in another embodiment in a range of between 0 and 2, and in still another embodiment in a range of between 0 and 1, inclusive. In one embodiment the resorcinol moiety is 2-methylresorcinol. In another embodiment the resorcinol moiety is an unsubstituted resorcinol moiety in which n is zero. Polymers are also contemplated which contain structural units derived from mixtures of 1,3-dihydroxybenzene moieties, such as a mixture of unsubstituted resorcinol and 2-methylresorcinol.

In one embodiment when a resorcinol moiety is used, the resorcinol moiety is added to a reaction mixture as an aqueous solution, or mixture with water comprising at least some undissolved resorcinol moiety. In many circumstances aqueous solutions containing a resorcinol moiety such as unsubstituted resorcinol discolor with time. Although the invention is not dependent upon theory, it is believed that at least some color formation in solution may result from oxidation of resorcinol moiety species. W1hen a discolored solution comprising resorcinol moiety is employed in synthesis of polymers of the present invention, the product polymers may be darker in color than desired, making said polymers unsuitable for use in many applications. It has been discovered that aqueous solutions and water mixtures comprising resorcinol moiety may be inhibited from discoloration by providing a pH in one embodiment of about 5 or less in the aqueous solution, in another embodiment of about 4 or less in the aqueous solution, and in still another embodiment of about 3 or less in the aqueous solution. In one embodiment when an aqueous solution comprising resorcinol moiety at a pH of about 5 or less is employed in synthesis of polymers in embodiments of the present invention, the product polymers are typically lighter in color than corresponding polymers prepared using an aqueous solution comprising resorcinol moiety without added acid. In another embodiment when an aqueous solution comprising resorcinol moiety at a pH of about 5 or less is employed in synthesis of polymers in embodiments of the present invention, the product polymers are typically lighter in color than corresponding polymers prepared using an aqueous solution comprising resorcinol moiety wherein the pH of the aqueous solution is greater than about 5. Color can be determined by visual observation or by other methods known to those skilled in the art, such as spectroscopic methods.

The amount of water present in a solution or mixture comprising water and at least one resorcinol moiety is in one embodiment in a range of between about 0.5 wt % and about 70 wt %, in another embodiment in a range of between about 0.5 wt % and about 30 wt %, in another embodiment in a range of between about 1 wt % and about 25 wt %, in another embodiment in a range of between about 2 wt % and about 20 wt %, and in still another embodiment in a range of between about 5 wt % and about 15 wt %. In one particular embodiment the amount of water present in a solution or mixture comprising water and at least one resorcinol moiety is in a range of between about 50 wt % and about 60 wt %.

The pH of about 5 or less may be provided in some embodiments using at least one inorganic acid or at least one organic acid, or at least one of an inorganic acid in combination with at least one of an organic acid. In various embodiments inorganic acids comprise hydrochloric acid, phosphoric acid, phosphorous acid, sulfuric acid, and mixtures thereof. In various embodiments organic acids comprise organic sulfonic acids, methanesulfonic acid, p-toluenesulfonic acid, sulfonic acid-functionalized ion exchange resins, organic carboxylic acids, lactic acid, malic acid, glyceric acid, oxalic acid, malonic acid, succinic acid, glutaric acid, adipic acid, citric acid, tartaric acid, glycolic acid, thioglycolic acid, tartronic acid, acetic acid, halogenated acetic acids, monochloroacetic acid, dichloroacetic acid, trichloroacetic acid, propionic acid, gluconic acid, ascorbic acid, and mixtures thereof. In some embodiments gluconic acid may be particularly beneficial because of its iron complexing ability and lack of corrosive properties compared to certain other acids.

In other embodiments an aqueous solution with a pH of 5 or less may be provided using a recycle water stream derived from washing an organic solution comprising a polymer with an aqueous solution comprising acid. In a particular embodiment the recycle water stream is derived from washing an organic solution comprising a condensation polymer and at least one salt, such as an alkali metal halide. In another particular embodiment the recycle water stream is derived from washing an organic solution comprising bisphenol A polycarbonate polymer with an aqueous acidic solution. In another particular embodiment the recycle water stream is derived from washing an organic solution comprising a resorcinol arylate-comprising polymer with an aqueous acidic solution. In another particular embodiment the recycle water stream is derived from washing an organic solution comprising a copolyestercarbonate with an aqueous acidic solution. In various embodiments suitable recycle water streams may comprise at least one alkali metal halide, such as, but not limited to, sodium chloride, sodium fluoride, potassium chloride, or potassium fluoride. In other embodiments suitable recycle water streams may comprise at least one amine salt, such as a trialkylamine hydrochloride salt. In some embodiments amine salts are derived from trialkylamines described hereinbelow. In various embodiments suitable recycle water streams comprise both of at least one alkali metal halide and at least one amine salt. In particular embodiments suitable recycle water streams comprise triethylamine hydrochloride and sodium chloride. In other embodiments suitable recycle water streams may comprise at least one amine salt which is a quaternary ammonium salt, quaternary phosphonium salt, or guanidinium salt. In some embodiments suitable quaternary ammonium salts, quaternary phosphonium salts, or guanidinium salts are those described hereinbelow. An aqueous solution comprising resorcinol moiety in recycle water has in one embodiment a pH less than or equal to about 5, in another embodiment a pH less than or equal to about 4, in another embodiment a pH less than or equal to about 3, in another embodiment a pH in a range of between about 1 and about 3, in another embodiment a pH in a range of between about 1 and about 2, and in still another embodiment a pH in a range of between about 1 and about 1.6.

In embodiments wherein the recycle water stream comprises at least one member selected from the group consisting of an amine salt, a trialkylamine hydrochloride salt, a quaternary ammonium salt, a quaternary phosphonium salt, and a guanidinium salt, then in one embodiment the recycle water stream may serve as the source of at least a portion of the total amount of these species when said species or species derived therefrom are required as catalysts in the copolyestercarbonate synthesis process. In other embodiments the recycle water stream may serve as the source of the total amount of these species when these species are required as catalysts. In a particular embodiment a recycle water stream is analyzed for the catalyst species present, and, if necessary, additional catalyst species may be added to the recycle water stream or the recycle water stream may be diluted with additional water to adjust the concentration of catalyst species so that the total amount of catalyst species added to the reaction mixture is derived from the recycle water without needing to add catalyst separately. In particular embodiments analysis and optional concentration adjustment are done before using the recycle water to prepare a solution comprising resorcinol moiety. Those skilled in the art will recognize that an aqueous composition comprising resorcinol moiety and components of a recycle water stream may be prepared and used in polymerization reactions even though said aqueous composition without resorcinol moiety was not actually used to wash an organic solution comprising a polymer.

Aqueous solutions comprising resorcinol moiety and acid or an acidic recycle water stream may be prepared before use and, if so desired, shipped to a different location and/or stored for a period of time. Said solutions may be at essentially room temperature or at a temperature above room temperature. In one embodiment solutions of a resorcinol moiety comprising water may be at a temperature above the melting point of the resorcinol moiety, for example at a temperature above the melting point of unsubstituted resorcinol.

In another embodiment a dihydroxy-substituted aromatic hydrocarbon moiety such as a resorcinol moiety may be added to a reaction mixture in a molten state. In a particular embodiment a molten resorcinol moiety may comprise water. In another particular embodiment a molten resorcinol moiety comprises water and at least one inorganic acid or at least one organic acid, or at least one of an inorganic acid in combination with at least one of an organic acid. In another particular embodiment a molten resorcinol moiety is essentially free of water and comprises at least one inorganic acid or at least one organic acid, or at least one of an inorganic acid in combination with at least one of an organic acid. Both types of acids may be selected from those disclosed hereinabove. In some embodiments organic acids may be selected due to their lower corrosive properties. In the present context essentially free of water means that no free water is intentionally added and the water present is that adventitiously obtained, for example through adsorption from the environment. In some embodiments essentially free of water means that a molten resorcinol moiety comprises less than about 0.5 wt % water. The amount of acid which may be present when a resorcinol moiety is added to a reaction mixture in the molten state is an amount sufficient to retard color formation over any time period compared to a corresponding composition comprising a resorcinol moiety without added acid. In various embodiments the amount of acid which may be present is in one embodiment in a range of between about 0.1 ppm and about 100,000 ppm, in another embodiment in a range of between about 1 ppm and about 10,000 ppm, in another embodiment in a range of between about 10 ppm and about 8,000 ppm, in another embodiment in a range of between about 50 ppm and about 4,000 ppm, and in still another embodiment in a range of between about 100 ppm and about 3,000 ppm.

The method for preparing hydroxy-terminated polyester intermediate further comprises combining at least one catalyst with the reaction mixture. Said catalyst may be present at a total level in one embodiment in a range of between about 0.1 and about 10 mole %, and in another embodiment in a range of between about 0.2 and about 6 mole % based on total molar amount of acid chloride groups. Suitable catalysts comprise tertiary amines, quaternary ammonium salts, quaternary phosphonium salts, guanidinium salts, and mixtures thereof. Suitable tertiary amines include triethylamine, dimethylbutylamine, diisopropylethylamine, 2,2,6,6-tetramethylpiperidine, and mixtures thereof. Other contemplated tertiary amines include N—$C_1$–$C_6$-alkylpyrrolidines, such as N-ethylpyrrolidine, N—$C_1$–$C_6$-piperidines, such as N-ethylpiperidine. N-methylpiperidine, and N-isopropylpiperidine, N—$C_1$–$C_6$-morpholines, such as N-ethylmorpholine and N-isopropyl-morpholine, N—$C_1$–$C_6$-dihydroindoles, N—$C_1$–$C_6$-dihydroisoindoles, N—$C_1$–$C_6$-tetrahydroquinolines, N—$C_1$–$C_6$-tetrahydroisoquinolines, N—$C_1$–$C_6$-benzomorpholines, 1-azabicyclo-[3.3.0]-octane, quinuclidine, N—$C_1$–$C_6$-alkyl-2-azabicyclo-[2.2.1]-octanes, N—$C_1$–$C_6$-alkyl-2-azabicyclo-[3.3.1]-nonanes, and N—$C_1$–$C_6$-alkyl-3-azabicyclo-[3.3.1]-nonanes, N,N,N',N'-tetraalkylalkylenediamines, including N,N,N',N'-tetraethyl-1,6-hexanediamine. In particular embodiments tertiary amines are triethylamine and N-ethylpiperidine.

When the catalyst comprises at least one tertiary amine, then said catalyst may be present at a total level in one embodiment in a range of between about 0.1 and about 10 mole %, in another embodiment in a range of between about 0.2 and about 6 mole %, in another embodiment in a range of between about 1 and about 4 mole %, and in still another embodiment in a range of between about 2 and about 4 mole % based on total molar amount of acid chloride groups. In another particular embodiment a tertiary amine may be present at a total level in a range of between about 0.5 and about 2 mole % based on total molar amount of acid chloride groups. In one embodiment of the invention all of the at least one tertiary amine is present at the beginning of the reaction before addition of acid chloride to dihydroxy-substituted aromatic hydrocarbon moiety. In another embodiment of the invention all of the at least one tertiary amine is present at the beginning of the reaction before addition of acid chloride to a resorcinol moiety. In another embodiment a portion of any tertiary amine is present at the beginning of the reaction and a portion is added following or during addition of acid chloride to dihydroxy-substituted aromatic hydrocarbon moiety. In still another embodiment a portion of any tertiary amine is present at the beginning of the reaction and a portion is added following or during addition of acid chloride to a resorcinol moiety. In this latter embodiment the amount of any tertiary amine initially present with dihydroxy-substituted aromatic hydrocarbon moiety may range in one embodiment from about 0.005 wt. % to about 10 wt. %, in another embodiment from about 0.01 to about 1 wt. %, and in still another embodiment from about 0.02 to about 0.3 wt. % based on total amine.

Suitable quaternary ammonium salts and quaternary phosphonium salts include quaternary ammonium and quaternary phosphonium halides, illustrative examples of which include, but are not limited to, tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridinium bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amine-ammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide. Suitable guanidinium salts include, but are not limited to, hexaalkylguanidinium salts and alpha,omega-bis(pentaalkylguanidinium)alkane salts, comprising hexaalkylguanidinium halides, alpha,omega-bis(pentaalkylguanidinium)alkane halides, hexaethylguanidinium halides, and hexaethylguanidinium chloride.

Organic solvents substantially immiscible with water suitable for use in hydroxy-terminated polyester intermediate synthesis include those which are in one embodiment less than about 5 wt. % soluble in water, and in another embodiment less than about 2 wt. % soluble in water under the reaction conditions. Suitable organic solvents include, but are not limited to, dichloromethane, trichloroethylene, tetrachloroethane, chloroform, 1,2-dichloroethane, trichloroethane, toluene, xylene, trimethylbenzene, chlorobenzene, o-dichlorobenzene, the chlorotoluenes, and mixtures thereof. In particular embodiments water-immiscible solvents are chlorinated aliphatic compounds such as dichloromethane.

Suitable acid chlorides for use in the method of the invention comprise dicarboxylic acid dichlorides which comprise aromatic dicarboxylic acid dichlorides comprising monocyclic moieties, including isophthaloyl dichloride, terephthaloyl dichloride, or mixtures of isophthaloyl and terephthaloyl dichlorides, or comprising polycyclic moieties, including diphenyl dicarboxylic acid dichloride, diphenylether dicarboxylic acid dichloride, diphenylsulfone dicarboxylic acid dichloride, diphenylketone dicarboxylic acid dichloride, diphenylsulfide dicarboxylic acid dichloride, and naphthalenedicarboxylic acid dichloride, such as naphthalene-2,6-dicarboxylic acid dichloride; or comprising mixtures of aromatic dicarboxylic acid dichlorides comprising monocyclic moieties; or mixtures of aromatic dicarboxylic acid dichlorides comprising polycyclic moieties; or mixtures of aromatic dicarboxylic acid dichlorides comprising both monocyclic and polycyclic moieties. In some embodiments the dicarboxylic acid dichloride comprises mixtures containing isophthaloyl and/or terephthaloyl dichlorides as typically illustrated in formula (XI).

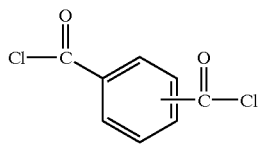

Formula (XI)

Either or both of isophthaloyl and terephthaloyl dichlorides may be present. In various embodiments the acid chlorides comprise mixtures of isophthaloyl and terephthaloyl dichloride in a molar ratio of isophthaloyl to terephthaloyl of in some embodiments about 0.25–4.0:1. When the isophthalate to terephthalate ratio is greater than about 4.0:1, then unacceptable levels of cyclic oligomer may form. When the isophthalate to terephthalate ratio is less than about 0.25:1, then unacceptable levels of soluble polymer may form. In some embodiments the molar ratio of isophthalate to terephthalate is about 0.4–2.5:1, and in other embodiments about 0.67–1.5:1.

In another of its embodiments the present invention includes hydroxy-terminated copolyester intermediates comprising resorcinol arylate polyester chain members in combination with chain members derived from dicarboxylic acid alkylene or diol alkylene chain members (so-called "soft-block" segments), said copolyester intermediates being substantially free of anhydride linkages in the polyester segments. Related copolyesters containing soft-block segments are disclosed in commonly owned U.S. Pat. No. 5,916,997.

The term soft-block as used herein, indicates that some segments of these particular polymers are made from non-aromatic monomer units. Such non-aromatic monomer units are generally aliphatic and are known to impart flexibility to the soft-block-containing polymers. Such copolyester intermediates include those comprising structural units of formulas (I), (XII), and (XIII):

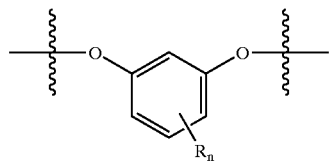

Formula (I)

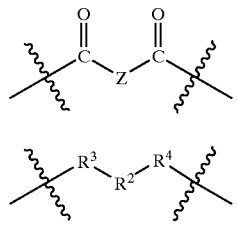

Formula (XII)

Formula (XIII)

wherein R is at least one Of $C_{1-12}$ alkyl or halogen, n is 0–3), Z is a divalent aromatic;.c radical, R is a $C_{3-20}$ straight chain alkylene, $C_{3-10}$ branched alkylene, or $C_{4-10}$ cyclo- or bicycloalkylene group, and $R^3$ and $R^4$ each independently represent

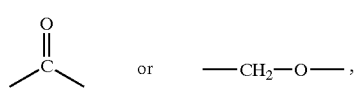

wherein formula (XIII) contributes in some embodiments from about 1 to about 45 mole percent to the ester linkages of the polyester intermediate. Additional embodiments of the present invention provide a composition wherein formula (XIII) contributes in some embodiments from about 5 to about 40 mole percent to the ester linkages of the polyester intermediate, and in other embodiments from about 5 to about 20 mole percent to the ester linkages of the polyester intermediate. Other embodiments provide a composition wherein $R^2$ represents $C_{3-14}$ straight chain alkylene Or $C_{5-6}$ cycloalkylene. Still other embodiments provide a composition wherein $R^2$ represents $C_{3-10}$ straight-chain alkylene or $C_6$-cycloalkylene. Formula (XII) represents an aromatic dicarboxylic acid residue. The divalent aromatic radical Z in formula (XII) may be derived from at least one of the suitable dicarboxylic acid residues as defined hereinabove, for example at least one of 1,3-phenylene, 1,4-phenylene, or 2,6-naphthylene. In some embodiments Z comprises at least about 40 mole percent 1,3-phenylene. In various embodiments of copolyester intermediates containing soft-block chain members n in formula (I) is zero.

In some embodiments copolyester intermediates containing resorcinol arylate chain members are those comprising from about 1 to about 45 mole % sebacate or cyclohexane-1,4-dicarboxylate units. In a particular embodiment copolyester intermediates containing resorcinol arylate chain members comprise resorcinol isophthalate and resorcinol sebacate units in molar ratio between 8.5:1.5 and 9.5:0.5. In a representative procedure said copolyester intermediate is prepared using sebacoyl chloride in combination with isophthaloyl dichloride.

In various embodiments the present invention provides an interfacial method for preparing copolyestercarbonates substantially free of anhydride linkages, said method comprising steps of preparing a mixture comprising at least one dihydroxy-substituted aromatic hydrocarbon moiety, at least one catalyst and at least one organic solvent substantially immiscible with water; and adding to the mixture at least one acid chloride while maintaining the pH between about 3 and about 8.5, wherein the total molar amount of acid chloride groups is stoichiometrically deficient relative to the total molar amount of phenolic groups. In another embodiment the present invention provides an interfacial method for preparing copolyestercarbonates substantially free of anhydride linkages, said method comprising steps of preparing a mixture comprising at least one dihydroxy-substituted aromatic hydrocarbon moiety, at least one catalyst and at least one organic solvent substantially immiscible with water; and adding to the mixture at least one acid chloride and a base in some specific stoichiometric ratio of base to acid chloride that may or may not vary with time and at specific rates that may or may not vary with time, wherein the total molar amount of acid chloride groups is stoichiometrically deficient relative to the total molar amount of phenolic groups.

In the method for polyester intermediate preparation the pH of the reaction mixture during addition of at least one acid chloride is maintained in one embodiment between about 3 and about 8.5, in another embodiment between about 4 and about 8.5, in another embodiment between about 5 and about 8.5, in another embodiment between about 5 and about 8, and in another embodiment between about 5 and about 7.5 throughout addition of the majority of the at least one acid chloride to the at least one resorcinol moiety. The pH is typically maintained through use of at least one base. Suitable bases to maintain the pH include alkali metal hydroxides, alkaline earth hydroxides, and alkaline earth oxides. In some embodiments the bases are potassium hydroxide or sodium hydroxide. In a particular embodiment the base is sodium hydroxide. The base to maintain pH may be included in the reaction mixture in any convenient form, such as solid or liquid. In a particular embodiment a base is included in the reaction mixture as an aqueous solution. In various embodiments base and acid chloride are added separately by means known in the art, including, but not limited to, one or more individual liquid addition vessels, gravimetric feeders, liquid metering pumps or metering systems, melt feed means and other known equipment.

In various embodiments at least a portion of the total amount of base is added to the reaction mixture as an aqueous solution simultaneously with acid chloride addition. In some embodiments the stoichiometric ratio of base to acid chloride is held at a substantially constant value during the addition process. Substantially constant in the present context means that any variation in ratio is adventitious. In particular embodiments the ratio of base to acid chloride during simultaneous addition is held at a constant value in a range of between about 80% and about 105% of the stoichiometric value. In other particular embodiments the ratio of base to acid chloride during simultaneous addition is held at a constant value in one embodiment in a range of between about 85% and about 105% of the stoichiometric value, in another embodiment in a range of between about 90% and about 105% of the stoichiometric value, in another embodiment in a range of between about 90% and about 100% of the stoichiometric value, and in another embodiment in a range of between about 90% and about 99% of the stoichiometric value. In other embodiments the ratio of base to acid chloride during simultaneous addition is varied during the addition process, in some embodiments in a range of between about 0% and about 1000% of the stoichiometric value, in other embodiments in a range of between about 0% and about 500% of the stoichiometric value, in other embodiments in a range of between about 0% and about 200% of the stoichiometric value, in other embodiments in a range of between about 0% and about 125% of the stoichiometric value, in other embodiments in a range of between about 0% and about 105% of the stoichiometric value, in other embodiments in a range of between about 85% and about 110% of the stoichiometric value, in other embodiments in a range of between about 90% and about 105% of the stoichiometric value, in other embodiments in a range of between about 90% and about 100% of the stoichiometric value, and in other embodiments in a range of between about 90% and about 99% of the stoichiometric value. When particularly high ratios of base to acid chloride are employed during simultaneous addition, then such a high ratio may be typically employed for a short interval, for example in some embodiments during about 0.1% to about 5% of the acid chloride addition amount. Any addition ratio far from stoichiometric is typically accounted for during the rest of the acid chloride addition. Thus, in various embodiments the average addition ratio of base to acid chloride over the entire addition of acid chloride may be in a range for example in some embodiments of between about 85% and about 105% of stoichiometric, whereas the instantaneous addition ratio may be in a much broader range. In some embodiments any remaining base not added during acid chloride addition is added following completion of acid chloride addition. In still other embodiments acid chloride addition is started before the start of base addition so that there is an initial ratio of base to acid chloride of 0%. In particular embodiments said delay time may be such that the pH remains in the desired range of in one embodiment between about 3 and about 8.5, and in another embodiment between about 5 and about 8.5. In still other embodiments base addition is stopped and then restarted at one or more points during acid chloride addition so that the stoichiometric ratio of base to acid chloride momentarily becomes 0%. In other particular embodiments the addition rates of base and of acid chloride are held at substantially constant values during the addition process. In other particular embodiments the addition rate of either base or acid chloride, or of both base and acid chloride are varied during the addition process.

In other embodiments of the invention base and acid chloride are introduced simultaneously to the reaction mixture at a substantially constant molar ratio of base to acid chloride in one embodiment for a time period of at least about 60% of total acid chloride addition, in another embodiment for at least about 70% of total acid chloride addition, in another embodiment for at least about 80% of total acid chloride addition, in another embodiment for at least about 90% of total acid chloride addition, in another embodiment for at least about 94% of total acid chloride addition, in another embodiment for at least about 98% of total acid chloride addition, in another embodiment for greater than 98% of total acid chloride addition, and in another embodiment for essentially 100% of total acid chloride addition. In other embodiments flow rates of acid chloride and of base may be varied during the acid chloride addition as long as the average molar flow rate ratio of base to acid chloride is maintained at a substantially constant value in one embodiment for a time period of at least about 60% of total acid chloride addition, in another embodiment for at least about 70% of total acid chloride addition, in another embodiment for at least about 80% of total acid chloride addition, in an other embodiment for at least about 90% of total acid chloride addition, in another embodiment for at least about 94% of total acid chloride addition, in another embodiment for at least about 98% of total acid chloride addition, and in another embodiment for greater than 98% of total acid chloride addition.

In some particular embodiments base and acid chloride are added starting at a stoichiometric ratio in a range of between about 94% and 96% followed by increasing either continuously or in more than one step or in a single step the ratio to a value in a range of between about 96% and 120% during the course of the addition. In one particular embodiment the ratio is increased when the pH of the reaction mixture begins to fall below a value in a range of between about 6 and 7.5. In other particular embodiments the rate of addition of both base and of acid chloride is increased either continuously or in more than one step or in a single step during the course of addition. In other particular embodiments the rate of addition of both base and of acid chloride is decreased either continuously or in more than one step or in a single step during the course of addition. In other particular embodiments the rates of addition of base and of acid chloride are varied independently of one another. In various embodiments base may be added in sequence from more than one liquid addition vessel wherein the base is at different concentrations. In other embodiments base may be added in sequence from more than one liquid addition vessel at different rates of addition. In some embodiments depending upon such factors which include, but are not limited to, reactor configuration, stirrer geometry, stirring rate, temperature, total solvent volume, organic solvent volume, anhydride concentration, pH, the total time of addition of base and acid chloride may be less than about 120 minutes, in other embodiments in a range of between about 1 minute and about 60 minutes, in still other embodiments in a range of between about 2 minutes and about 30 minutes, and in still other embodiments in a range of between about 2 minutes and about 15 minutes.

In various embodiments of the present invention the addition of base and acid chloride in the defined ratios results in a pH of the reaction mixture in one embodiment in the range of between about 3 and about 8.5, and in another embodiment in a range of between about 5 and about 8.5. Consequently, the course of the reaction can be measured by monitoring the amount of base added in addition to or in place of monitoring the reaction by measuring pH of the reaction mixture. This is an advantage when pH must be measured accurately and instantaneously in a viscous interfacial reaction mixture which may be difficult to accomplish.

The temperature of the reaction mixture during polyester intermediate preparation may be any convenient temperature that provides a suitable reaction rate and a polyester intermediate substantially free of anhydride linkages. Convenient temperatures include those from about 10° C. to the boiling point of the lowest boiling bulk component in the reaction mixture under the reaction conditions. The reaction may be run under pressure. In various embodiments the reactor pressure may be in the range of from about 0 pounds per square inch gauge reading (psig) to about 100 psig. In some embodiments the reaction temperature may be in a range of between ambient temperature and the boiling point of the water-organic solvent mixture under the reaction conditions. In one embodiment the reaction is performed at the boiling point of the organic solvent in the water-organic solvent mixture. In a particular embodiment the reaction is performed at the boiling point of dichloromethane.

In various embodiments the total molar amount of acid chloride groups added to the reaction mixture is stoichiometrically deficient relative to the total molar amount of phenolic groups. Said stoichiometric ratio may be desirable so that hydrolysis of acid chloride groups is minimized, and so that nucleophiles such as phenolic and/or phenoxide may be present to destroy any adventitious anhydride linkages, should any form under the reaction conditions. The total molar amount of acid chloride groups includes at least one dicarboxylic acid dichloride, and any mono-carboxylic acid chloride chain-stoppers and any tri- or tetra-carboxylic acid tri- or tetra-chloride branching agents which may be used. The total molar amount of phenolic groups includes dihydroxy-substituted aromatic hydrocarbon moieties, and any mono-phenolic chain-stoppers and any tri- or tetra-phenolic branching agents which may be used. The stoichiometric ratio of total phenolic groups to total acid chloride groups is in one embodiment in a range of between about 1.9:1 and about 1.01:1, in another embodiment in a range of between about 1.5:1 and about 1.01:1, in another embodiment in a range of between about 1.25:1 and about 1.01:1, and in still another embodiment in a range of between about 1.10:1 and about 1.01:1.

The presence or absence of adventitious anhydride linkages following complete addition of the at least one acid chloride to the at least one dihydroxy-substituted aromatic hydrocarbon moiety will typically depend upon the exact stoichiometric ratio of reactants and the amount of catalyst present, as well as other variables. For example, if a sufficient molar excess of total phenolic groups is present, anhydride linkages are often found to be absent. In some embodiments a molar excess of at least about 1% and in other embodiments a molar at least about 3% of total amount of phenolic groups over total amount of acid chloride groups may suffice to eliminate anhydride linkages under the reaction conditions. When anhydride linkages may be present, it is often desirable that the final pH of the reaction mixture be in a range in one embodiment of between about 7 and about 12, in another embodiment of between about 7 and about 9, in another embodiment of between about 7.2 and about 8.8, in another embodiment of between about 7.5 and about 8.5, and in still another embodiment of between about 7.5 and about 8.3 so that nucleophiles such as phenolic, phenoxide and/or hydroxide may be present to destroy any adventitious anhydride linkages. Therefore, in some of its embodiments the method of the invention may further comprise the step of adjusting the pH of the reaction mixture in one embodiment to a value in a range of between about 7 and about 12 following complete addition of the at least one acid chloride to the at least one dihydroxy-substituted aromatic hydrocarbon moiety. The pH may be adjusted by any convenient method, for example using an aqueous base such as aqueous sodium hydroxide.

Provided the final pH of the reaction mixture is in one embodiment in a range of between about 7 and about 12 and in another embodiment in a range of between about 7 and about 9, the method of the invention in another embodiment may further comprise the step of stirring the reaction mixture for a time sufficient to destroy any adventitious anhydride linkages, should any be present. The necessary stirring time will depend upon reactor configuration, stirrer geometry, stirring rate, temperature, total solvent volume, organic solvent volume, anhydride concentration, pH, and other factors. Suitable stirring rates depend upon similar factors known to those skilled in the art and may readily be determined. In some embodiments suitable stirring rates are in a range of between about 50 rpm and about 600 rpm, in other embodiments in a range of between about 100 rpm and about 500 rpm, in other embodiments in a range of between about 200 rpm and about 500 rpm, and in still other embodiments in a range of between about 300 rpm and about 400 rpm. In some instances the necessary stirring time is essentially instantaneous, for example within seconds of pH adjustment to a value in a range of between about 7 and about 12, assuming any adventitious anhydride linkages were present to begin with. For typical laboratory scale reaction equipment a stirring time in one embodiment of at least about 1 minute, in another embodiment of at least about 3 minutes, and in another embodiment of at least about 5 minutes may be required. By this process nucleophiles, such as phenolic, phenoxide and/or hydroxide, may have time to destroy completely any adventitious anhydride linkages, should any be present.

At least one chain-stopper (also referred to sometimes hereinafter as capping agent) may also be present in the method and compositions of the invention. One purpose of adding at least one chain-stopper is to limit the molecular weight of the polymer, thus providing polymer with controlled molecular weight. In other embodiments at least some chain-stopper may be added when polyester intermediate is to be either used in solution or recovered from solution for subsequent use such as in copolymer formation which may require the presence of reactive end-groups, typically phenolic hydroxy, on the polyester segments. A chain-stopper may be at least one of mono-phenolic compounds, mono-carboxylic acid chlorides, and/or mono-chloroformates. The amount of chain-stopper added at any time during the reaction may be such as to cap all or at least a portion of polymer chain end-groups. Typically, at least one chain-stopper, when present, may be present in quantities of 0.05 to 10 mole %, based on dihydroxy-substituted aromatic hydrocarbon moieties in the case of mono-phenolic compounds and based on acid dichlorides in the case mono-carboxylic acid chlorides and/or mono-chloroformates.

Suitable mono-phenolic compounds include monocyclic phenols, such as unsubstituted phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, in which in some embodiments about 47 to 89% of the hydrogen atoms are part of methyl groups as described in U.S. Pat. No. 4,334,053. For some embodiments a mono-phenolic UV screener is used as capping agent. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. In various embodiments mono-phenolic chain-stoppers are at least one of phenol, p-cumylphenol, or resorcinol monobenzoate.

Suitable mono-carboxylic acid chlorides include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

Chain-stopper may be added to the reaction mixture in any convenient manner. In some embodiments chain-stopper can be combined together with the dihydroxy-substituted aromatic hydrocarbon moieties, can be contained in solution of acid chloride, can be added separately from acid chloride, or can be added to the reaction mixture after production of a precondensate. In some embodiments at least some of the chain-stopper is present in the reaction mixture before addition of acid chloride. In other embodiments all of the chain-stopper is present in the reaction mixture before addition of acid chloride. In some embodiments at least some of the chain-stopper is added to the reaction mixture during addition of acid chloride. In other embodiments all of the chain-stopper is added to the reaction mixture during or after addition of acid chloride. In other particular embodiments chain-stopper is added to the reaction mixture either continuously or in more than one step or in a single step during the course of acid chloride addition. In one example of continuous addition chain-stopper either in liquid or molten form is metered continuously either at a substantially constant rate or at a variable rate into the reaction mixture during the course of acid chloride addition. In one example of stepwise addition solid chain-stopper is added in portions or in a single portion to the reaction mixture during the course, of acid chloride addition. If mono-carboxylic acid chlorides and/of mono-chloroformates are used as chain-stoppers, they are in some embodiments introduced mixed together with dicarboxylic acid dichlorides. These chain-stoppers can also be added to the reaction mixture at a moment when the dicarboxylic acid dichlorides have already reacted substantially or to completion. If phenolic compounds are used as chain-stoppers, they can be added to the reaction mixture in one embodiment during the reaction, or in another embodiment before the beginning of the reaction between dihydroxy-substituted aromatic hydrocarbon moiety and acid chloride moiety. When substantially hydroxy-terminated arylate-containing precondensate or oligomers are desired, then chain-stopper may be absent or only present in small amounts to aid control of oligomer molecular weight.

In another embodiment the method of the invention may encompass the inclusion of at least one branching agent such as a trifunctional or higher functional carboxylic acid chloride and/or trifunctional or higher functional phenol. Such branching agents, if included, can be used in various embodiments in quantities of 0.005 to 1 mole %, based on acid chlorides or dihydroxy-substituted aromatic hydrocarbon moieties used, respectively. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane. 1,4-bis-[(4,4-dihydroxytriphenyl)methyl]-benzene. In various embodiments phenolic branching agents may be introduced first with the dihydroxy-substituted aromatic hydrocarbon moieties or during the course of acid chloride addition, whilst acid chloride branching agents may be introduced together with acid dichlorides.

If desired, the polyester intermediate of the invention may be made by the present method further comprising the addition of a reducing agent. Suitable reducing agents include, for example, sodium sulfite, or a borohydride, such as sodium borohydride. When present, any reducing agents are typically used in quantities of from 0.25 to 2 mole %, based on moles of dihydroxy-substituted aromatic hydrocarbon moiety. The reaction mixture may also comprise a metal chelating agent such as sodium gluconate.

In some embodiments the polyester intermediate may be recovered from the reaction mixture before copolyestercarbonate synthesis. Recovery methods are well known to those skilled in the art and may include one or more steps of acidification of the mixture, for example with at least one of an inorganic acid or an organic acid as described hereinabove; subjecting the mixture to liquid-liquid phase separation; washing the organic phase with water and/or a dilute acid such as at least one of an inorganic acid or an organic acid as described hereinabove; precipitating by usual methods such as through treatment with water or anti-solvent precipitation with, for example, an alcohol such as methanol, ethanol, and/or isopropanol; isolating the resulting precipitates; and drying to remove residual solvents. It is also contemplated, however, to proceed to a subsequent process without acidification or phase separation, and this is often possible without loss of yield or purity in the hydroxy-terminated polyester intermediate.

In another embodiment the polyester intermediate may remain in solution for subsequent process steps. In a particular embodiment the entire interfacial reaction mixture comprising polyester intermediate, water, and a water-immiscible organic solvent is carried on to subsequent process steps such as phosgenation to prepare block copolyestercarbonate.

In another embodiment of tho invention a polyester intermediate is prepared by a transesterification reaction in the melt by combining at least one dihydroxy-substituted aromatic hydrocarbon moiety with at least one diether of a dicarboxylic acid. In a particular embodiment of the invention a resorcinol arylate-containing polyester intermediate is prepared by a transesterification reaction in the melt by combining at least one 1,3-dihydroxybenzene moiety with at least one diester of a dicarboxylic acid. Suitable dicarboxylic acid diesters include those with structures corresponding to dicarboxylic acids which are formal precursors for dicarboxylic acid dichlorides described hereinabove. In one embodiment dicarboxylic acid diesters are diaryl esters derived from a dicarboxylic acid and a monohydroxy aromatic compound, wherein aromatic moieties are monocyclic or polycyclic aromatic moieties. In particular embodiments illustrative examples of dicarboxylic acid diaryl esters may comprise monocyclic aromatic dicarboxylic acid diaryl esters such as diaryl isophthalate, diaryl terephthalate, or their halogen or chlorine-substituted derivatives; or polycyclic aromatic dicarboxylic acid diaryl esters such as fused polycyclic aromatic dicarboxylic acid diaryl esters including naphthalene diaryl ester; linked polycyclic aromatic moieties including biaryl diaryl esters or biphenyl diaryl ester, or moieties of the formula Ar'O—Ar—$Y^1$—Ar—OAr', wherein Ar and Ar' are independently aromatic moieties as defined herein and $Y^1$ is $C_{1-10}$ alkylene, haloalkylene, —O—, —S—, —SO—, —$SO_2$—, —CO—, —($R^{13}$)P (=O)—, or —($R^{13}$)N—, wherein $R^{13}$ comprises alkyl, haloalkyl, aryl, haloaryl, alkaryl, haloalkaryl, aralkyl, haloaralkyl, cycloalkyl, or halocycloalkyl. In some particular embodiments polycyclic aromatic dicarboxylic acid diaryl esters comprise biphenyl-4,4'-diaryldicarboxylate, diphenylether-4,4'-diaryldicarboxylate, diphenylsulfone-4,4'-diaryldicarboxylate, diphenyl ketone-4,4'-diaryldicarboxylate, diphenylsulfide-4,4'-diaryldicarboxylate, diphenylmethane-4,4'-diaryldicarboxylate, diphenyldichloromethane-4,4'-diaryldicarboxylate, or naphthalene diaryldicarboxylate, such as naphthalene-2,6-diaryldicarboxylate and naphthalene-2,7-diaryldicarboxylate; or halogen or chlorine-substituted derivatives of said polycyclic aromatic dicarboxylic acid diaryl esters. In other embodiments dicarboxylic acid diesters comprise alkylene dicarboxylic acid diesters, and in a particular embodiment alkylene dicarboxylic acid diaryl esters, wherein alkylene groups comprise in various embodiments $C_{3-20}$ straight chain alkylene, $C_{3-20}$ branched alkylene, or $C_{4-20}$ cyclo- or bicycloalkylene group. In some particular embodiments the aliphatic dicarboxylic acid diester is selected from the group consisting of diphenyl sebacate and diphenyl cyclohexane-1,4-dicarboxylate.

In some embodiments dicarboxylic acid diesters comprise mixtures of any combination of the foregoing alkylene, monocyclic and polycyclic aromatic dicarboxylic acid diaryl esters in amounts to provide proportions of structural units in the polyester intermediate as described hereinabove. In various embodiments diaryl esters comprise diphenyl esters and are derived from phenol. In other embodiments diaryl esters comprise those derived from monohydroxy aromatic compounds comprising at least one electron withdrawing group ortho, meta, or para to the oxygen substituent of the monohydroxy moiety. In another embodiment diaryl esters comprise those derived from monohydroxy aromatic compounds comprising at least one electron withdrawing group ortho or para to the oxygen substituent of the monohydroxy moiety. In another embodiment diaryl esters comprise those derived from monohydroxy aromatic compounds comprising at least one electron withdrawing group ortho or para to the oxygen substituent of the monohydroxy moiety selected from the group consisting of carboalkoxy, carboaryloxy, carboaryl, halo, cyano, and nitro, and mixtures thereof. In another embodiment diaryl esters comprise those derived from monohydroxy aromatic compounds selected from the group consisting of o-carbomethoxyphenol, o-carbomethoxymethylphenol, o-carboethoxyphenol, o-carbopropoxyphenol, o-chlorophenol, o-carbophenylphenol, o-carbophenoxyphenol, o-carbobenzoxyphenol, and o-nitrophenol.

In some embodiments aromatic dicarboxylic acid diaryl esters comprise diphenyl isophthalate, diphenyl terephthalate, or mixtures thereof. Either or both of isophthalate and terephthalate moieties may be present. For the most part, both are present in a molar ratio of isophthalate to terephthalate in the range of about 0.2–5.0:1. In another embodiment the molar ratio of isophthalate to terephthalate is about 0.4–2.5:1, and in another embodiment about 0.67–1.5:1.

In one embodiment the molar ratio of dihydroxy-substituted aromatic hydrocarbon moiety employed to dicarboxylic acid diester employed is greater than 1:1; in another embodiment in the range of between about 1.01:1 and about 1.90:1, in another embodiment in the range of between about 1.01:1 and about 1.25:1, and in still another embodiment in a range of between about 1.1:1 and about 1.2:1.

The polyester intermediates made by the present methods are substantially free of anhydride linkages linking at least two mers of the polyester chain. In a particular embodiment said polyesters comprise dicarboxylic acid residues derived from a mixture of iso- and terephthalic acids and dihydroxy-substituted aromatic hydrocarbon residues derived from at least one resorcinol moiety as illustrated in formula (XIII):

Formula (XIII)

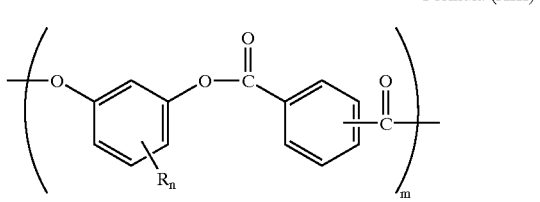

wherein R is at least one of $C_{1-12}$ alkyl or halogen, n is 0–3, and m is at least about 8. In various embodiments n is zero and m is between about 4 and about 300. The molar ratio of isophthalate to terephthalate is in one embodiment in a range of about 0.25–4.0:1, in another embodiment in a range of about 0.4–2.5:1, and in still another embodiment in a range of about 0.67–1.5:1.

In another of its embodiments the present invention comprises thermally stable block copolyestercarbonates comprising polyester block segments in combination with organic carbonate block segments. In one particular embodiment polyester block segments comprise resorcinol arylate-containing chain members. The segments comprising polyester chain members in such copolymers are substantially free of anhydride linkages. Substantially free of anhydride linkages means that the copolyestercarbonates show decrease in molecular weight in one embodiment of less than 10% and in another embodiment of less than 5% upon heating said copolyestercarbonate at a temperature of about 280–290° C. for five minutes.

The block copolyestercarbonates include those comprising alternating arylate and organic carbonate blocks, as illustrated in formula (XIV) for a particular embodiment wherein dicarboxylic acid residues are derived from a mixture of iso- and terephthalic acids and dihydroxy-substituted aromatic hydrocarbon residues are derived from at least one resorcinol moiety, wherein R is at least one of $C_{1-12}$ alkyl or halogen, n is 0–3, and $R^5$ is at least one divalent organic radical:

Formula (XIV)

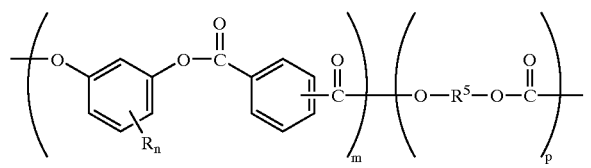

In various embodiments the arylate blocks have a degree of polymerization (DP), represented by m, in one embodiment of at least about 4, in another embodiment of at least about 10, in another embodiment of at least about 20 and in still another embodiment of about 30–150. In some embodiments m is at least about 3, in other embodiments at least about 10 and in still other embodiments about 20–300. In other embodiments m is between about 20 and about 50. The DP of the organic carbonate blocks, represented by p, is in one embodiment at least about 1, in another embodiment at least about 3, in another embodiment at least about 10, and in still another embodiment about 20–200. In other embodiments p has a value in a range of between about 20 and about 50. Within the context of the invention "alternating carbonate and arylate blocks" means that the copolyestercarbonates comprise at least one carbonate block and at least one arylate block. In a particular embodiment block copolyestercarbonates comprise at least one arylate block and at least two carbonate blocks. In another particular embodiment block copolyestercarbonates comprise an A-B-A architecture with at least one arylate block ("B") and at least two carbonate blocks ("A"). In another particular embodiment block copolyestercarbonates comprise a B-A-B architecture with at least two arylate blocks ("B") and at least one carbonate block ("A"). Mixtures of block copolyestercarbonates with different architectures are also within the scope of the invention.

In the copolyestercarbonates of the present invention the distribution of the blocks may be such as to provide a copolymer having any desired weight proportion of arylate blocks in relation to carbonate blocks. Different applications may require different weight proportion of arylate blocks in relation to carbonate blocks. In some embodiments some injection molding applications may require from 5 to 60% by weight arylate blocks. In other embodiments some film applications may require 60 to 95% by weight arylate blocks. The copolyestercarbonates contain in one embodiment about 10% to about 99% by weight arylate blocks; in another embodiment about 40% to about 99% by weight arylate blocks; in another embodiment about 60% to about 98% by weight arylate blocks; in another embodiment about 80% to about 96% by weight arylate blocks; and in still another embodiment about 85% to about 95% by weight arylate blocks.

Although a mixture of iso- and terephthalate is illustrated in formula (XIV), the dicarboxylic acid residues in the arylate blocks may be derived from ally suitable dicarboxylic acid residue, as defined hereinabove, or mixture of suitable dicarboxylic acid residues, including those derived from aliphatic diacid dichlorides (so-called "soft-block" segments). In some embodiments n is zero and the arylate blocks comprise dicarboxylic acid residues derived from a mixture of iso- and terephthalic acid residues, wherein the molar ratio of isophthalate to terephthalate is in one embodiment in a range of about 0.25–4.0:1, in another embodiment in a range of about 0.4.–2.5:1, and in still another embodiment in a range of about 0.67–1.5:1.

In the organic carbonate blocks, each $R^5$ in formula (XIV) is independently a divalent organic radical. In various embodiments said radical is derived from at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable dihydroxy-substituted aromatic hydrocarbons include all those described hereinabove for use in the synthesis of the hydroxy-terminated polyester intermediate.

Depending upon whether or not any unreacted dihydroxy-substituted aromatic hydrocarbon is present in the reaction mixture remaining from the synthesis of hydroxy-terminated polyester intermediate or is added to the reaction mixture subsequently, $R^5$ in the carbonate blocks of formula (XIV) may consist of or at least partially comprise a radical derived from at least one dihydroxy-substituted aromatic hydrocarbon used in the synthesis of hydroxy-terminated polyester intermediate. In a particular embodiment depending upon whether or not any unreacted 1.3-dihydroxybenzene moiety is present in the reaction mixture or is added to the reaction mixture subsequently, $R^5$ in the carbonate blocks of formula (XIV) may consist of or at least partially comprise a radical derived from a 1,3-dihydroxybenzene moiety. Therefore, in one particular embodiment of the present invention the copolyestercarbonate comprises carbonate blocks with $R^5$ radicals derived from a dihydroxy-substituted aromatic hydrocarbon identical to at least one 1,3-dihydroxybenzene moiety in the polyarylate blocks. In another embodiment the copolyestercarbonate comprises carbonate blocks with $R^5$ radicals derived from a dihydroxy-substituted aromatic hydrocarbon different from any dihydroxy-substituted aromatic hydrocarbon moiety in the polyarylate blocks. In another particular embodiment the copolyestercarbonate comprises carbonate blocks with $R^5$ radicals derived from a dihydroxy-substituted aromatic hydrocarbon different from any 1,3-dihydroxybenzene moiety in the polyarylate blocks. In yet another embodiment the copolyestercarbonate comprises carbonate blocks containing a mixture of $R^5$ radicals derived from dihydroxy-substituted aromatic hydrocarbons, at least one of which is the same as and at least one of which is different from any dihydroxy-substituted aromatic hydrocarbon in the polyarylate blocks. In yet another particular embodiment the copolyestercarbonate comprises carbonate blocks containing a mixture of $R^5$ radicals derived from dihydroxy-substituted aromatic hydrocarbons, at least one of which is the same as and at least one of which is different from any 1,3-dihydroxybenzene moiety in the polyarylate blocks. When a mixture of $R^5$ radicals derived from dihydroxy-substituted aromatic hydrocarbons is present, then the molar ratio of dihydroxy compounds identical to those present in the polyarylate blocks to those dihydroxy compounds different from those present in the polyarylate blocks is typically about 1:999 to 999:1. In some particular embodiments the copolyestercarbonates comprise carbonate blocks containing a mixture of $R^5$ radicals derived from at least one of unsubstituted resorcinol, a substituted resorcinol, and bisphenol A. In other particular embodiments the copolyestercarbonates comprise carbonate blocks containing a mixture of $R^5$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising arylate chain members and blocks comprising organic carbonate chain members (as illustrated for copolyestercarbonates comprising chain members derived from a mixture of iso- and terephthalic acids and dihydroxy-substituted aromatic hydrocarbon residues derived from at least one resorcinol moiety) may comprise at least one of

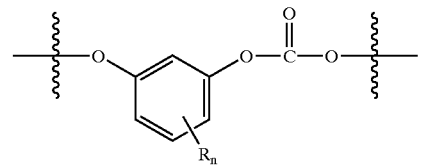

Formula (XVI)

The presence of a significant proportion of ester linkages of the type (a) may result in undesirable color formation in the copolyestercarbonates. Although the invention is not limited by theory, it is believed that color may arise, for example, when $R^5$ in formula (XIV) is bisphenol A and the moiety of formula (XIV) undergoes Fries rearrangement during subsequent processing and/or light-exposure. In a particular embodiment the copolyestercarbonate is substantially comprised of a diblock copolymer with a carbonate linkage between an arylate block and an organic carbonate block. In another particular embodiment the copolyestercarbonate is substantially comprised of an A-B-A triblock carbonate-ester-carbonate copolymer with carbonate linkages between the all arylate block and organic carbonate end-blocks. In another particular embodiment the block copolyestercarbonate is substantially comprised of a B-A-B triblock ester-carbonate-ester copolymer with carbonate linkages between the organic carbonate block and the arylate end-blocks. Mixtures of block copolyestercarbonates with different architectures linked by carbonate linkages or ester linkages, or mixtures of carbonate and ester linkages are also within the scope of the invention.

In another embodiment the copolyestercarbonate comprises arylate blocks linked by carbonate linkages, for example as shown in the representative structure of Formula (XVII) (as illustrated for copolyestercarbonates comprising chain members derived from a mixture of iso- and terephthalic acids and dihydroxy-substituted aromatic hydrocarbon residues derived from at least one resorcinol moiety):

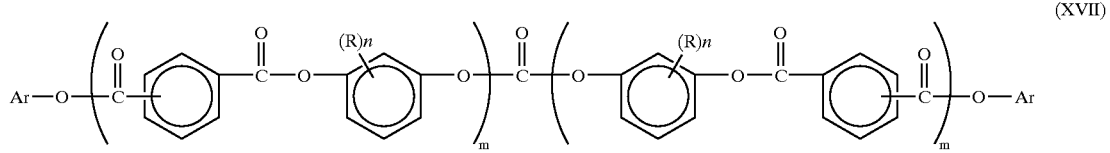

(XVII)

(a) an ester linkage between a suitable dicarboxylic acid residue of an arylate moiety and an —O—$R^5$—O— moiety of an organic carbonate moiety, for example as illustrated in formula (XV), wherein $R^5$ is as previously defined for formula (XIV):

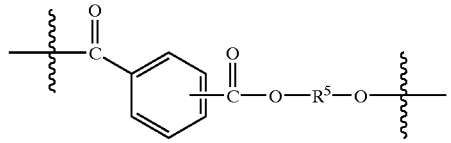

Formula (XV)

and (b) a carbonate linkage between a diphenol residue of a resorcinol arylate moiety and a —(C=O)—O— moiety of an organic carbonate moiety as shown in formula (XVI), wherein R and n are as previously defined:

wherein R is at least one of $C_{1-12}$ alkyl or halogen, n is 0–3, Ar is an aromatic moiety, and each m independently is in one embodiment at least about 4, in another embodiment at least about 10, in another embodiment at least about 20 and in still another embodiment about 30–150, and the arylate structural units are as described for formula (X) above. In some embodiments Ar comprises a hydroxyphenol residue derived from a dihydroxy-substituted aromatic hydrocarbon moiety (such as a 1,3-dihydroxybenzene moiety) or an aryloxycarboxyphenyl residue derived from an aromatic dicarboxylic acid diarylester. In other embodiments arylate blocks in formula (XVII) may be terminated, for example with a mono-phenolic moiety such as a mono-phenolic chain-stopper. Copolyestercarbonates comprising formula (XVII) may arise from reaction of hydroxy-terminated polyester intermediate with a carbonate precursor in the substantial absence of any dihydroxy compound different from the hydroxy-terminated polyester intermediate. In other embodiments the copolyestercarbonate may comprise a mixture of copolyestercarbonates with different structural units and different architectures, for example as described herein.

Copolyestercarbonates of the invention are prepared in one embodiment from polyester intermediates prepared by methods of the invention and containing at least some hydroxy-terminal sites on chains. In some embodiments said intermediates contain at least one and often two hydroxy-terminal sites on a majority of chains. In various embodiments said intermediates may be prepared by methods of the invention wherein the molecular weight and carboxylic acid end-group concentration of the intermediate are minimized and the phenolic hydroxy end-group concentration is maximized. Said intermediates have weight average molecular weight (vs. polystyrene standards) in one embodiment of at least about 900, in another embodiment of at least about 2000, and in still another embodiment of at least about 4000. In particular embodiments said polyester intermediates have weight average molecular weights in one embodiment of about 4,000 to about 40,000. In another embodiment of about 10,000 to about 30,000, in another embodiment of about 16,000 to about 25,000, and in another embodiment of about 18,000 to about 22,000. In some embodiments said intermediates have about 300–1500 ppm carboxylic acid end-groups. In other embodiments said intermediates have about 2–37,000 ppm phenolic hydroxy end-groups, and in still other embodiments about 2400–9700 ppm phenolic hydroxy end-groups. The polyester intermediates have in many embodiments a higher concentration of phenolic end-groups compared to carboxylic acid end-groups. Carboxylic acid end-groups may be present, for example, through hydrolysis of acid chloride groups under the reaction conditions and as adventitious acid groups present in dicarboxylic acid dichloride starting material.

In one embodiment of the invention thermally stable copolyestercarbonates may be prepared by reacting said hydroxy-terminated polyester intermediates with a carbonate precursor, often in the presence of a catalyst. In another embodiment thermally stable copolyestercarbonates may be prepared by reacting hydroxy-terminated polyester intermediates with a carbonate precursor and at least one dihydroxy-substituted aromatic hydrocarbon, often in the presence of a catalyst. In one particular embodiment thermally stable copolyestercarbonates may be prepared by reacting a resorcinol arylate-containing polyester intermediate with a carbonate precursor and at least one dihydroxy-substituted aromatic hydrocarbon, often in the presence of a catalyst. Optionally a branching agent and/or a chain-stopper such as described hereinabove may be present in the reaction mixture.

In various embodiments the carbonate precursor is phosgene. When phosgene is employed, this synthesis step may be conducted according to art-recognized interfacial procedures (i.e., also in a two-phase system) employing a suitable interfacial polymerization catalyst and a base. The interfacial reaction procedure may comprise water and at least one organic solvent substantially immiscible with water. Suitable water immiscible solvents include those described hereinabove in the preparation of hydroxy-terminated polyester intermediates. In one embodiment a suitable water-immiscible solvent is dichloromethane. Suitable bases include those described hereinabove. In one embodiment a suitable base is aqueous sodium hydroxide. The catalyst may be of the types and species described hereinabove in the preparation of hydroxy-terminated polyester intermediates. In various embodiments a suitable catalyst may comprise a tertiary amine, typically a trialkylamine such as triethylamine or a highly nucleophilic heterocyclic amine such as 4-dimethylaminomorpholine, or a phase transfer catalyst, most often a quaternary ammonium salt such as tetrabutylammonium chloride or bromide or tetrabutylphosphonium chloride or bromide. Mixtures of such catalysts, especially mixtures of trialkylamines and tetraalkylammonium salts, may also be employed.

In various embodiments of the invention at least one dihydroxy-substituted aromatic hydrocarbon different from hydroxy-terminated polyester intermediate may optionally be present in the reaction mixture. When present, at least one dihydroxy-substituted aromatic hydrocarbon different from hydroxy-terminated polyester intermediate may be introduced into the reaction mixture for copolyestercarbonate synthesis through any convenient method of combination. In one embodiment at least one dihydroxy-substituted aromatic hydrocarbon may be present as unreacted dihydroxy-substituted aromatic hydrocarbon from the polyester synthesis. In one particular embodiment at least one dihydroxy-substituted aromatic hydrocarbon may be present as unreacted 1,3-dihydroxybenzene moiety from resorcinol arylate-containing polyester synthesis. In another embodiment at least one dihydroxy-substituted aromatic hydrocarbon may be added following polyester synthesis, before or during reaction with carbonate precursor in copolyestercarbonate synthesis. In one particular embodiment at least one dihydroxy-substituted aromatic hydrocarbon is present as unreacted 1,3-dihydroxybenzene moiety from resorcinol arylate-containing polyester synthesis and at least one dihydroxy-substituted aromatic hydrocarbon is added following polyester synthesis, before or during reaction with carbonate precursor in copolyestercarbonate synthesis. Any dihydroxy compound added following polyester synthesis, before or during reaction with carbonate precursor in copolyestercarbonate synthesis, may be the same as or different from any dihydroxy-substituted aromatic hydrocarbon moiety present initially in polyester intermediate synthesis. In another particular embodiment the dihydroxy-substituted aromatic hydrocarbon comprises at least one of unsubstituted resorcinol or substituted resorcinol from polyester synthesis and at least one dihydroxy-substituted aromatic hydrocarbon added following polyester synthesis different from unsubstituted resorcinol or substituted resorcinol. In another embodiment a molar excess of dihydroxy-substituted aromatic hydrocarbon (relative to total moles acid chloride species present) is employed in polyester synthesis, in which case there may be some unreacted dihydroxy-substituted aromatic hydrocarbon remaining, and a second dihydroxy-substituted aromatic hydrocarbon is added before or during reaction with carbonate precursor in copolyestercarbonate synthesis. In another particular embodiment a molar excess of 1,3-dihydroxybenzene (relative to total moles acid chloride species present) is employed in polyester synthesis, in which case there may be some unreacted 1,3-dihydroxybenzene remaining, and bisphenol A is added before or during reaction with carbonate precursor in copolyestercarbonate synthesis. The amount of any dihydroxy-substituted aromatic hydrocarbon moiety (such as 1,3-dihydroxybenzene moiety) remaining unreacted from polyester synthesis is in one embodiment less than about 98 mole %, in another embodiment less than about 96 mole %, in another embodiment less than about 80 mole %, in another embodiment less than about 60 mole %, in another embodiment less than about 40 mole %, in another embodiment less than about 30 mole %, in another embodiment less than about 15 mole %, in another embodiment less than about 10 mole %, and in still another embodiment less than about 5 mole % of the dihydroxy-substituted aromatic hydrocarbon moiety initially present in polyester synthesis. In another particular embodiment the amount of dihydroxy-substituted aromatic hydrocarbon moiety (such as 1,3-dihydroxybenzene moiety) remaining unreacted from polyester synthesis is less than about 2 mole % of the dihydroxy-substituted aromatic hydrocarbon moiety initially present in polyester synthesis. In another particular embodiment the amount of dihydroxy-substituted aromatic hydrocarbon moiety remaining unreacted from polyester synthesis is in a range of between about 2 mole % and about 10 mole % of the dihydroxy-substituted aromatic hydrocarbon moiety initially present in polyester synthesis.

In various embodiments when phosgene is used as carbonate precursor, then the reaction pH may optionally be adjusted to a desired value prior to phosgenation, for example to a value in a range of between about 5 and about 11. In various embodiments phosgene may be introduced to the reaction mixture at a rate of from about 0.005 mole phosgene per mole hydroxy group per minute to about 0.2 mole phosgene per mole hydroxy group per minute. Typically a target value for the total amount of phosgene added to the reaction mixture is in one embodiment in a range of between about 100% and about 300%, in another embodiment in a range of between about 110% and about 200%, in another embodiment in a range of between about 110% and about 170%, and in another embodiment in a range of between about 120% and about 150% of the stoichiometric value based on total hydroxy groups. Hydroxy groups are those in hydroxy-containing compounds which comprise hydroxy-terminated polyester intermediate and any dihydroxy-substituted or monohydroxy-substituted aromatic hydrocarbon different from hydroxy-terminated polyester intermediate that may be present in the reaction mixture. The phosgene rate of addition may be substantially constant or variable.

In various embodiments of the method of the invention base is introduced into the reaction mixture simultaneously with phosgene addition. In certain embodiments base and phosgene are introduced simultaneously to the reaction mixture at a substantially constant molar ratio of base to phosgene. This molar ratio may be in one embodiment in the range of between about 1.8 and about 2.5 mole base per mole phosgene, in another embodiment in the range of between about 1.9 and about 2.4 mole base per mole phosgene, and in still another embodiment in the range of between about 1.95 and about 2.2 mole base per mole phosgene. Each ratio represents the average molar flow rate ratio over the course of the phosgenation, wherein the molar flow rate ratio is the molar flow rate of base addition divided by the molar flow rate of phosgene addition. In other embodiments flow rates of phosgene and of base may be varied during the phosgenation as long as the average molar flow rate ratio of base to phosgene is maintained within the desired range. The average molar flow rate ratio is in one embodiment the average of the set values for molar flow rate ratios during the course of phosgene addition. In particular embodiments the average molar flow rate ratio may include molar flow rate ratios that represent inadvertent and momentary excursions outside the desired range provided the average of molar flow rate ratios is in the desired range. Thus, the proportion of base employed according to the invention is not, as in the prior art, calculated primarily to maintain an established pH set point, but rather to maintain an established molar ratio with respect to phosgene. It has been discovered that this will inherently afford a pH during the reaction within the range of about 5.5 to about 11.

In various embodiments the ratio of base to phosgene may be advantageously varied within the specified bounds as may readily be determined by experiment. In some particular embodiments the rate of addition of both base and of phosgene is increased either continuously or in more than one step or in a single step during the course of addition. In other particular embodiments the rate of addition of both base and of phosgene is decreased either continuously or in more than one step or in a single step during the course of addition. When the total amount of phosgene has been delivered, the phosgene may be shut off and, if necessary, base may be added in an amount that is sufficient to achieve a final pH target, which is in many embodiments in the range of about 5.5 to about 11.5, and in some embodiments between about 7 and about 11.

It is also within the scope of the invention to monitor the reaction pH and to adjust the molar rate ratio of base to phosgene during the course of phosgene addition in order to avoid excessively low pH excursions (for example, a pH below about 5 to 6). This may be done for safety reasons. If desired, the molar rate ratio of base to phosgene may be momentarily increased in some embodiments to a value in a range of between about 2.5 and about 4 in order to bring the reaction pH into the desired range. This is sometimes necessary, for example in a particular embodiment, after at least about one mole of phosgene per mole of bisphenol equivalent has been delivered to the reaction mixture. Conversely, if the pH exceeds a high target value (for example, a pH above about 9.5 for copolyestercarbonate phosgenation), the base ratio may be momentarily decreased to a value in the range of 0 to about 2.0. With minimal experimentation, a suitable range of base-to-phosgene ratios may be found such that it is not often necessary to deviate from a constant base-to-phosgene ratio. It is also noted that because pH electrode performance under interfacial conditions is often poor, it may often be preferable to rely on flow rate measurements rather than pH measurements for control of base addition. However, in some embodiments, it may be advantageous to employ a simple scheme wherein the pH is monitored and the base-to-phosgene ratio is adjusted based on the measured pH. For example, it is within the scope of this invention to have a system wherein the molar rate ratio of base to phosgene during phosgenation is in the range of about 1.9 to 2.4 for a measured pH in the range of 7.5–9.0, and in the range of about 2.4–4 for measured pH below 7.5, and in the range of about 0–1.9 for measured pH above 9.0. Exact ratios and pH ranges may be readily determined by experiment.

It is sometimes desirable to conduct a post-reaction phosgenation step after the initial phosgenation process is completed. Such a step may be conducted for example because the initial phosgenation reaction is judged to be incomplete based on a qualitative or quantitative analysis of a sample of the product. For example, the product may show unreacted phenolic hydroxy groups. Appropriate analytical methods, such as those for detection of unreacted hydroxy groups, are well known to those skilled in the art. Post-reaction phosgenations may be conducted under conventional pH control or under controlled ratio base addition. If controlled ratio base addition is employed, the molar ratio may be in various embodiments in the range of between about 1.8 and about 4.0 mole base per mole phosgene. The amount of phosgene added in any optional post-reaction phosgenation is in one embodiment in a range of between about 1% and about 25%, in another embodiment in a range of between about 2% and about 20%, and in another embodiment in a range of between about 5% and about 15% of the stoichiometric amount based on the hydroxyl groups initially present prior to the initial phosgenation. In some embodiments an arbitrary amount of post-reaction phosgene is added, the amount necessary to react with unreacted hydroxy groups being readily determined by experiment.

In other embodiments of the invention base and phosgene are introduced simultaneously to the reaction mixture at a substantially constant molar ratio of base to phosgene for a time period in one embodiment of at least about 60% of total phosgene addition, in another embodiment for at least about 70% of total phosgene addition, in another embodiment for at least about 80% of total phosgene addition, in another embodiment for at least about 90% of total phosgene addition, in another embodiment for at least about 94% of total phosgene addition, in another embodiment for at least about 98% of total phosgene addition, in another embodiment for greater than 98% of total phosgene addition, and in another embodiment for essentially 100% of total phosgene addition. In other embodiments flow rates of phosgene and of base may be varied during the phosgenation as long as the average molar flow rate ratio of base to phosgene is maintained at a substantially constant value for a time period in one embodiment of at least about 60% of total phosgene addition, in another embodiment of at least about 70% of total phosgene addition, in another embodiment of at least about 80% of total phosgene addition, in another embodiment of at least about 90% of total phosgene addition, in another embodiment of at least about 94% of total phosgene addition, in another embodiment of at least about 98% of total phosgene addition, and in another embodiment for greater than 98% of total phosgene addition.

The block copolyestercarbonate may be used in solution or transferred by any convenient procedure to some other solvent for use. In some embodiments the copolyestercarbonate is recovered and isolated from solution by conventional procedures. These may include, for example, at least one step selected from the group consisting of anti-solvent precipitation, washing, drying and devolatilization-pelletization or film formation via extrusion.

Block copolyestercarbonates made by the method of the present invention have in one embodiment less than about 100 ppm, in another embodiment less than about 50 ppm, and in still another embodiment less than about 20 ppm phenolic end-groups. Said copolymers contain in one embodiment less than about 50 ppm and in another embodiment less than about 25 ppm free 1,3-dihydroxybenzene moiety. The copolymers have in one embodiment less than about 2000 ppm, in another embodiment less than about 500 ppm, in another embodiment less than about 200 ppm, in another embodiment less than about 100 ppm, and in still another embodiment less than about 50 ppm carboxylic acid end-groups. In some embodiments the copolyestercarbonates have carboxylic acid end-group concentration in a range of between 0 ppm and about 100 ppm. The concentration of carboxylic acid end-groups in the copolyestercarbonates is typically less than that present in the hydroxy-terminated polyester intermediate. Carboxylic acid end-groups in said polyester intermediate may react with carbonate precursor in the copolyestercarbonate synthesis step. For example, when phosgene is the carbonate precursor, carboxylic acid groups may react to form carboxylic acid chlorides which may then react with any phenolic groups present, for example phenolic end-groups on polyester intermediate and any free dihydroxy-substituted aromatic hydrocarbon moiety, for example remaining from hydroxy-terminated polyester synthesis or added subsequently.

In the methods of making copolyestercarbonates in the present invention there may be present following phosgenation some polyester intermediate which is not covalently bound to a carbonate moiety. For example there may be present in the phosgenation reaction mixture at least a portion of polyester intermediate possessing end-groups which are not reactive with carbonate precursor. Illustrative examples of such end-groups may include carboxylic acid or carboxylic acid chloride or end-capped species without any functional group. Therefore, in another of its embodiments the present invention comprises a method for making the copolyestercarbonates of the invention in combination with a polyarylate containing structural units comprising those of the polyarylate blocks in the copolyestercarbonate, said polyarylate being made in the same process as said copolyestercarbonate. When it is desired to isolate substantially pure copolyestercarbonate, then the level of said polyarylate present in copolyestercarbonate is in one embodiment less than about 20 wt. %, in another embodiment less than about 10 wt. % and in still another embodiment less than about 4 wt. % of copolyestercarbonate. In particular embodiments the level of said polyarylate is less than about 1 wt. % of copolyestercarbonate isolated substantially pure. When it is desired to prepare a blend of copolyestercarbonate with polyarylate through methods as described herein, then proportions of the copolyestercarbonates in such blends are typically up to about 80 wt. % of the composition with the remainder being polyarylate.

When copolyestercarbonate synthesis is performed in the presence of at least one dihydroxy-substituted aromatic hydrocarbon moiety different from hydroxy-terminated polyester intermediate, then a polycarbonate may be formed which is not covalently bound to polyester intermediate. In one embodiment wherein at least two different dihydroxy-substituted aromatic hydrocarbon moieties different from hydroxy-terminated polyester intermediate are present, then a polycarbonate copolymer may form. In a particular embodiment wherein a 1,3-dihydroxybenzene moiety is present along with a second dihydroxy-substituted aromatic hydrocarbon, then a polycarbonate copolymer may form with structural units derived from both 1,3-dihydroxybenzene moiety and from the second dihydroxy-substituted aromatic hydrocarbon. Therefore, in another of its embodiments the present invention comprises the said copolyestercarbonates in combination with at least one polycarbonate, said polycarbonate being made in the same process as the carbonate block-forming step of said copolyestercarbonate synthesis. In a particular embodiment a polycarbonate is formed containing structural units comprising those of the polycarbonate blocks in the copolyestercarbonate. In another particular embodiment a polycarbonate is formed containing structural units comprising those of the polycarbonate blocks in the copolyestercarbonate and those derived from any second dihydroxy-substituted aromatic hydrocarbon present in the reaction mixture. In another particular embodiment a polycarbonate is formed comprising structural units derived from a 1,3-dihydroxybenzene moiety. In still another particular embodiment a polycarbonate is formed comprising structural units derived from a 1,3-dihydroxybenzene moiety and bisphenol A. When it is desired to isolate substantially pure copolyestercarbonate, then the level of said polycarbonate present in copolyestercarbonate is in some embodiments less than about 20 wt. %, in other embodiments less than about 10 wt. % and in still other embodiments less than about 4 wt. % of copolyestercarbonate. In other particular embodiments the level of said polycarbonate is less than about 2 wt. % of copolyestercarbonate isolated substantially pure. When it is desired to prepare a blend of copolyestercarbonate with at least one polycarbonate through synthesis by methods of the invention, then at least one polycarbonate in the blends may be prepared essentially simultaneously with carbonate block formation in the copolyestercarbonate synthesis. Alternatively, at least one polycarbonate in the blends may be prepared after the block copolyestercarbonate formation is at least partially or essentially complete, for example, in one option, through addition of additional components comprising dihydroxy-substituted aromatic hydrocarbon moiety, carbonate precursor, and, optionally, chain-stopper. The proportions of the copolyestercarbonates in such blends are determined chiefly by the resulting proportions of arylate blocks, which comprise the active weatherability-improving entities, typical proportions providing about 10–50% by weight of arylate blocks in the blend. Typically blends of copolyestercarbonate with up to about 95 wt. % polycarbonate may be prepared through synthesis by methods of the invention. In a particular embodiment blends of copolyestercarbonate comprising bisphenol A carbonate blocks may be prepared along with bisphenol A comprising polycarbonate through synthesis by methods of the invention in the presence of phosgene.

It is believed that the weatherability and certain other beneficial properties of the copolyestercarbonates of the invention are attributable, at least in part, to the occurrence of thermally or photochemically induced Fries rearrangement of arylate blocks to yield o-hydroxybenzophenone moieties or analogs thereof which serve as stabilizers to UV radiation. More particularly, at least a portion of arylate chain members can rearrange to yield chain members with at least one hydroxy group ortho to at least one ketone group. Such rearranged chain members are typically o-hydroxybenzophenone-type chain members, often comprising one or more of the following structural moieties (as illustrated for copolyestercarbonates comprising chain members derived from a mixture of iso- and terephthalic acids and dihydroxy-substituted aromatic hydrocarbon residues derived from at least one resorcinol moiety):

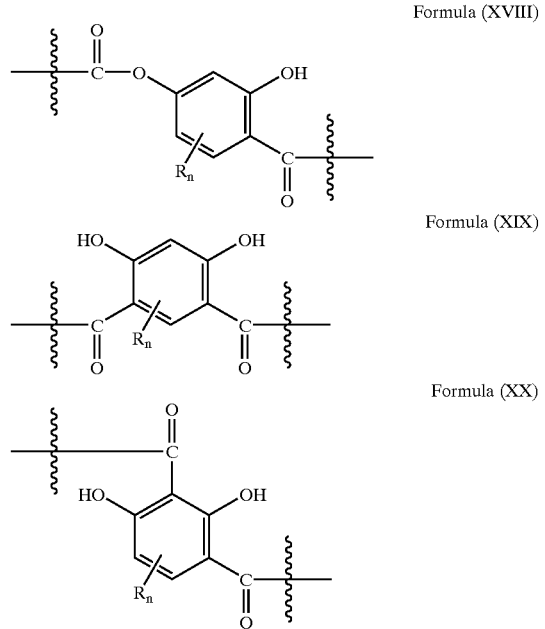

Formula (XVIII)

Formula (XIX)

Formula (XX)

wherein R and n are as previously defined in formula (XIV). It is also contemplated to introduce moieties of the types illustrated in formulas (XVIII), (XIX), and (XX) via synthesis and polymerization of appropriate monomers in copolyestercarbonates made by the method of the present invention. In various particular embodiments the present invention provides thermally stable copolyestercarbonates comprising structural units represented by formulas (III) and (XVIII), wherein the molar ratio of structural units represented by formula (III) to structural units represented by formula (XVIII) ranges in one embodiment from about 99:1 to about 1:1, and in another embodiment from about 99:1 to about 80:20.

Articles comprising at copolyestercarbonate made by the method of the invention are another embodiment of the present invention. In various embodiments articles may comprise the copolyestercarbonate, for example in admixture with additives known in the art, such as conventional UV screeners, for use for example in applications such as injection molding, thermoforming, in-mold decoration, and like applications. In other embodiments articles of the present invention are multilayer articles comprising two or more layers, typically in contiguous superposed contact with one another. In various embodiments multilayer articles comprise a substrate layer comprising at least one thermoplastic polymer, thermoset polymer, cellulosic material, glass, ceramic, or metal, and at least one coating layer thereon, said coating layer comprising a copolyestercarbonate made by the method of the invention. Optionally, the multilayer articles may further comprise an interlayer, for example an adhesive interlayer (or tie layer), between any substrate layer and any coating layer or film comprising a copolyestercarbonate made by the method of the invention. Multilayer articles of the invention include, but are not limited to, those which comprise a substrate layer and a coating layer comprising a copolyestercarbonate made by the method of the invention; those which comprise a substrate layer with a coating layer comprising said copolyestercarbonate on each side of said substrate layer; and those which comprise a substrate layer and at least one coating layer comprising a copolyestercarbonate made by the method of the invention with at least one interlayer between a substrate layer and a coating layer. Any interlayer may be transparent and/or may contain an additive, for example a colorant or decorative material such as metal flake. If desired, an overlayer may be included over the coating layer comprising a copolyestercarbonate made by the method of the invention, for example to provide abrasion or scratch resistance. In one embodiment the substrate layer, coating layer comprising a copolyestercarbonate made by the method of the invention, and any interlayers or overcoating layers are in contiguous superposed contact with one another. In any embodiment a copolyestercarbonate layer may comprise additives known in the art for use with conventional copolyestercarbonates or polycarbonates, including conventional UV screeners, heat stabilizers, flow promoters, lubricants, dyes, pigments, and the like.

Representative multilayer articles which can be made which comprise compositions of the invention include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, and housings; outboard motor housings; depth finder housings, personal water-craft; jet-skis; pools; spas; hot-tubs; steps;

step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to molding, in-mold decoration, baking in a paint oven, lamination, and/or thermoforming.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLE 1 AND COMPARATIVE EXAMPLE 1

A 1100 liter batch reactor was equipped with an agitator, reflux condenser, means for introducing phosgene and aqueous caustic solution, pH electrode, and a recirculation loop. This reactor was used to synthesize batches of copolyestercarbonates from resorcinol, isophthalic acid dichloride and terephthalic acid dichloride, phenol, bisphenol A, and phosgene. The synthesis reaction comprised two principal steps. The first step comprised charging the reactor with a water solution of resorcinol, dichloromethane, phenol and triethylamine catalyst. The formulations for these reactions is given in Table 1. A 50:50 mixture of isophthalic acid dichloride and terephthalic acid dichloride (66 kg.; molten) was added over 15 minutes with concurrent addition of 49.3 kg. 50 wt % NaOH solution. At the end of the acid chloride addition, the pH was held at about 7.5–8.5 for about 3–10 minutes. This required another 2.58 kg. 50 wt % NaOH solution. This first step was common to both the example of the invention and the comparative example.

In the second step, 9.52 kg. bisphenol A and 148 liters water were added to the reactor. Phosgene was added at a fixed rate and aqueous caustic solution was added either under pH control (comparative example) or at constant molar ratios of base to phosgene (example of the invention). The constant molar ratio of base to phosgene was in the range of 2.18 to 2.19. The product was analyzed for residual carboxylic acid end-groups (ppm COOH) and phenolic end-groups (ppm OH). The results of these two series of reactions are shown in Table 2.

TABLE 1

| Component | C. Example 1 | Example 1 |
|---|---|---|
| Resorcinol | 39.4 kg. | 39.4 kg |
| Water | 48.5 kg. | 48.5 kg. |
| Dichloromethane | 352 liters | 352 liters |
| Phenol | 1.38 kg. | 1.38 kg. |
| Triethylamine | 0.66 kg. | 0.66 kg. |

TABLE 2

| Parameters | C. Example 1 | Example 1 | Example 2 |
|---|---|---|---|
| Caustic Addition Mode | pH control | Ratio Addition | Ratio Addition |
| Number of Batches | 28 | 61 | 1 |
| ppm COOH | 340 ± 300 | 66 ± 85 | <10 |
| ppm OH | 508 ± 253 | 38 ± 37 | 34 |
| Phosgene Required (% Excess) | 200 ± 60 | 94 ± 17 | 83 |

Table 2 shows that using ratio caustic addition for the phosgenation step in Example 1 significantly lowers both the residual acid and residual phenolic end-group levels as well as the variability of these values. Further, the amount of excess phosgene required with ratio caustic addition in Example 1 was significantly lower than that required with pH control caustic addition in Comparative Example 1.

EXAMPLE 2

A copolyestercarbonate was synthesized in a reaction mixture comprising resorcinol, isophthalic acid dichloride and terephthalic acid dichloride, phenol, bisphenol A, and phosgene in the manner described in Example 1. In the second step, 9.52 kg. bisphenol A and 148 liters water were added to the reactor. Phosgene was added at a fixed rate and aqueous caustic solution was added at constant molar ratios of base to phosgene with the ratio being adjusted if the pH of the reaction exceeded 9.0 or fell below 7.5 (example of the invention). The constant molar ratio of base to phosgene was in the range of 2.18 to 2.19. If the pH exceeded 9.0 the caustic or phosgene flow rate was adjusted to give a ratio of 1.63 to 1.64 and if the pH fell below 7.5 the phosgene or caustic flow rate was adjusted to give a ratio of 2.73 to 2.74. These ratios were maintained until the pH measurement was between 7.5 to 9.0, at which time the phosgene or caustic flow was adjusted to give a ratio in the range of 2.18 to 2.19. The product was analyzed for residual carboxylic acid end-groups (ppm COOH) and phenolic end-groups (ppm OH). The results are shown in Table 2. Table 2 shows that using ratio caustic addition for the phosgenation step significantly lowers both the residual acid and residual phenolic end-group levels. Further, the amount of excess phosgene required with ratio caustic addition was significantly lower than that required with pH control caustic addition in Comparative Example 1.

EXAMPLE 3

A copolyestercarbonate was synthesized in a reaction mixture comprising resorcinol, isophthalic acid dichloride and terephthalic acid dichloride, phenol, bisphenol A, and phosgene in the manner described in Example 1. Phosgene and aqueous caustic solution were added at a constant molar ratio of base to phosgene of 1.89. The copolyestercarbonate had less than 25 ppm phenolic OH end-groups and less than 25 ppm carboxylic acid end-groups.

EXAMPLE 4

A copolyestercarbonate was synthesized in a reaction mixture comprising resorcinol, isophthalic acid dichloride and terephthalic acid dichloride, phenol, bisphenol A, and phosgene in the manner described in Example 1. Phosgene and aqueous caustic solution were added at a constant molar ratio of base to phosgene of 1.93. The copolyestercarbonate had less than 25 ppm phenolic OH end-groups and less than 25 ppm carboxylic acid end-groups.

EXAMPLE 5

A copolyestercarbonate was synthesized in a reaction mixture comprising resorcinol, isophthalic acid dichloride and terephthalic acid dichloride, phenol, bisphenol A, and phosgene in the manner described in Example 1. Phosgene and aqueous caustic solution were added at a constant molar ratio of base to phosgene of 2.0. The copolyestercarbonate had less than 25 ppm phenolic OH end-groups and less than 25 ppm carboxylic acid end-groups.

EXAMPLE 6

A copolyestercarbonate was synthesized in a reaction mixture comprising resorcinol, isophthalic acid dichloride and terephthalic acid dichloride, phenol, bisphenol A, and phosgene in the manner described in Example 1. Phosgene and aqueous caustic solution were added at a constant molar ratio of base to phosgene of 2.07. The copolyestercarbonate had less than 25 ppm phenolic OH end-groups and less than 25 ppm carboxylic acid end-groups.

COMPARATIVE EXAMPLE 6

A copolyestercarbonate was synthesized in a reaction mixture comprising resorcinol, isophthalic acid dichloride and terephthalic acid dichloride, phenol, bisphenol A, and phosgene in the manner described in Example 1. Phosgene was added at a fixed rate and aqueous base was added in response to pH measurement. FIG. 1 shows a graph of measured pH versus time for this phosgenation reaction. The ratio of moles phosgene used to moles phosgene required by stoichiometry in this reaction was 3.10.

EXAMPLE 7

A copolyestercarbonate was synthesized in a reaction mixture comprising resorcinol, isophthalic acid dichloride and terephthalic acid dichloride, phenol, bisphenol A, and phosgene in the manner described in Example 1. Phosgene and aqueous caustic solution were added at constant molar ratios of base to phosgene. Table 3 shows details of phosgene addition protocol.

In batch 796 in the table the molar rate ratio of base to phosgene was constant at 2.18 for an initial period of the reaction corresponding to 1.57 moles phosgene added per mole bisphenol A equivalent, wherein bisphenol A equivalent comprises the totality of aromatic hydroxy groups in the reaction mixture divided by two. After this initial phosgene addition, the molar rate ratio of base to phosgene was increased to 3.03 for the last 1.22 kilograms of phosgene. Finally, an additional 1.77 kilograms phosgene was added in a post-reaction step. In batch 798 in the table the molar rate ratio of base to phosgene was constant at 2.18 for an initial period of the reaction corresponding to 1.64 moles phosgene added per mole bisphenol A equivalent. After this initial phosgene addition, the molar rate ratio of base to phosgene was increased to 3.32 for the last 0.39 kilograms of phosgene. Finally, an additional 2.04 kilograms phosgene was added in a post-reaction step. In batches 799 and 840 in the table the molar rate ratio of base to phosgene was constant at 2.19 for the entire period of the reaction, and no phosgene was added in a post-reaction step.

Figure 2:
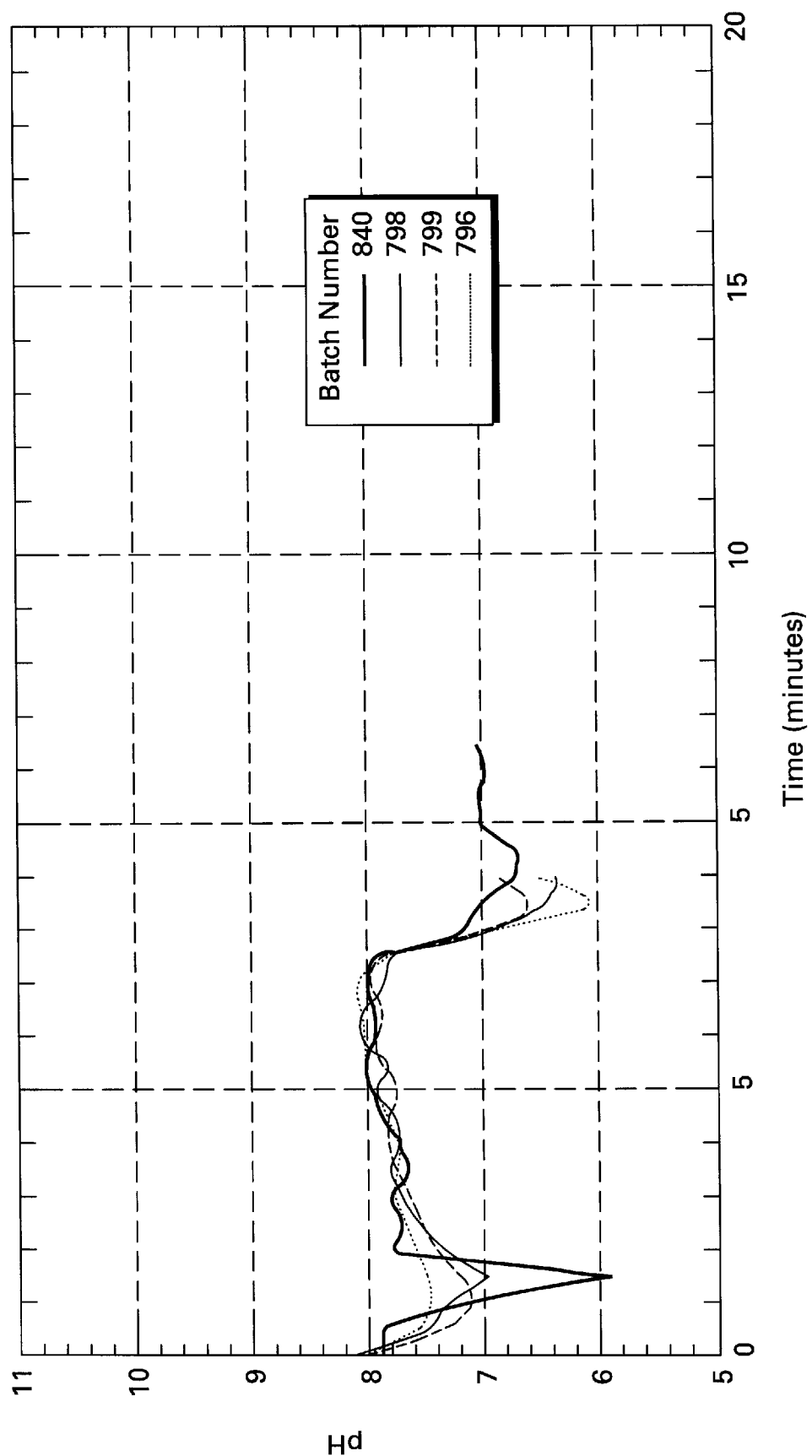
FIG. 2 shows a graph of measured pH versus time for four phosgenation reactions in which aqueous base was added in constant molar ratios to phosgene throughout the reaction.

FIG. 2 shows a graph of measured pH versus time for the four phosgenation reactions of Table 3 in which aqueous base was added at constant molar ratios to phosgene throughout the reaction. It can be seen that the fluctuations in pH with time are over a smaller range than is seen when base is added in response to a pH measurement as shown in FIG. 1. The ratio of moles phosgene used to moles phosgene required by stoichiometry in the four phosgenation reactions of Table 3 was in the range of 1.68 to 2.01 for the four reactions. Using controlled stoichiometric addition instead of adding base in response to a pH measurement allows more efficient usage of phosgene in the phosgenation reaction.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents and U.S. Patent applications cited herein are incorporated herein by reference.

What is claimed is:

1. A method for preparing a block copolyestercarbonate comprising chain members derived from at least one dihydroxy-substituted aromatic hydrocarbon moiety and at least one aromatic dicarboxylic acid moiety, said polymer being substantially free of anhydride linkages linking at least two mers of the polyester chain segments, comprising the steps of:

TABLE 3

| Batch # | kgs. phosgene added initially | base/phosgene molar rate ratio for phosgene added initially | moles phosgene added per mole bisphenol A equivalent | kgs. phosgene added following initial addition | base/phosgene molar rate ratio for phosgene added following initial addition | kgs. phosgene added in post-reaction | total kgs. phosgene added | total moles phosgene added per mole bisphenol A equivalent |
|---|---|---|---|---|---|---|---|---|
| 796 | 12.3 | 2.18 | 1.57 | 1.22 | 3.03 | 1.77 | 15.3 | 1.95 |
| 798 | 12.9 | 2.18 | 1.64 | 0.39 | 3.32 | 2.04 | 15.3 | 1.95 |
| 799 | 13.6 | 2.19 | 1.73 | — | — | — | 13.6 | 1.73 |
| 840 | 15.9 | 2.19 | 2.03 | — | — | — | 15.9 | 2.03 |

(a) preparing a hydroxy-terminated polyester intermediate comprising structural units derived from at least one dihydroxy-substituted aromatic hydrocarbon moiety and at least one aromatic dicarboxylic arid moiety; and (b) conducting a reaction of the polyester intermediate with phosgene in a reaction mixture comprising water, a substantially water-immiscible organic solvent, and a base, wherein base and phosgene are added simultaneously to the reaction mixture at a substantially constant molar ratio of base to phosgene for a time period of at least about 60% of the total amount of phosgene added.

2. The method of claim 1 wherein at least one (dihydroxy-substituted aromatic hydrocarbon moiety has the structure HO—D—OH, wherein D is a divalent aromatic radical with the structure of formula:

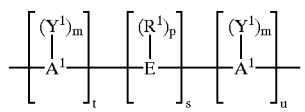

wherein $A^1$ is an aromatic group; E is at least one alkylene, alkylidene, or cycloaliphatic group; a sulfur-containing linkage; a phosphorus-containing linkage; an ether linkage; a carbonyl group; a tertiary nitrogen group; or a silicon-containing linkage; $R^1$ is hydrogen or a monovalent hydrocarbon group; $Y^1$ is independently a monovalent hydrocarbon group, alkenyl, allyl, halogen, bromine, chlorine; nitro; and OR, wherein R is a monovalent hydrocarbon group: "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

3. The method of claim 1 wherein the dihydroxy-substituted aromatic hydrocarbon moiety is at least one member selected from the group consisting of 3-(4-hydroxyphenyl)-1,1,3-trimethylindan-5-ol; 1-(4-hydroxyphenyl)-1,3,3-trimethylindan-5-ol; 6,6'-dihydroxy-3,3,3',3'- tetramethyl-1,1'-spirobiindane; 4,4'-(3,3,5-trimethylcyclohexylidene)diphenol; 4,4'-bis(3, 5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-3}$ alkyl-substituted resorcinols.

4. The method of claim 1 wherein the aromatic dicarboxylic acid moiety comprises an aromatic dicarboxylic acid dichloride or an aromatic dicarboxylic acid diester.

5. The method of claim 4 wherein the aromatic dicarboxylic acid moiety is an aromatic dicarboxylic acid dichloride selected from the group consisting of isophthaloyl dichloride, terephthaloyl dichloride, naphthalene-2,6-dicarboxylic acid dichloride, and mixtures thereof.

6. The method of claim 5 wherein the dicarboxylic acid dichloride is a mixture of isophthaloyl dichloride and terephthaloyl dichloride.

7. The method of claim 6 wherein the ratio of isophthaloyl dichloride to terephthaloyl dichloride is about 0.25–4.0:1.

8. The method of claim 6 wherein the ratio of isophthaloyl dichloride to terephthaloyl dichloride is about 0.67–1.5:1.

9. The method of claim 4 wherein the aromatic dicarboxylic acid moiety is an aromatic dicarboxylic acid diester selected from the group consisting of diphenyl isophthalate, diphenyl terephthalate, diphenyl naphthalene-2,6-dicarboxylate, and mixtures thereof.

10. The method of claim 9 wherein the dicarboxylic acid diester is a mixture of diphenyl isophthalate and diphenyl terephthalate.

11. The method of claim 10 wherein the ratio of diphenyl isophthalate to diphenyl terephthalate is about 0.25–4.0:1.

12. The method of claim 10 wherein the ratio of diphenyl isophthalate to diphenyl terephthalate is about 0.67–1.5:1.

13. The method of claim 1 wherein the base is at least one of an alkali metal hydroxide, an alkaline earth hydroxide, or an alkaline earth oxide.

14. The method of claim 13 wherein the base is aqueous sodium hydroxide.

15. The method of claim 1 wherein the organic solvent is selected from the group consisting of chloroform, chlorobenzene, dichloromethane, 1,2-dichloroethane, dichlorobenzene, toluene, xylene, trimethylbenzene, and mixtures thereof.

16. The method of claim 1 wherein the reaction of polyester intermediate with phosgene further comprises at least one catalyst selected from the group consisting of tertiary amines, quaternary ammonium salts, quaternary phosphonium salts, hexaalkylguanidinium salts, and mixtures thereof.

17. The method of claim 16 wherein the catalyst is selected from the group consisting of triethylamine, dimethylbutylamine, N-ethylpiperidine, N-methylpiperidine, diisopropylethylamine, 2,2,6,6-tetramethylpiperidine, tetrapropylammonium bromide, tetrabutylammonium bromide, tetrabutylammonium chloride, methyltributylammonium chloride, benzyltriethylammonium chloride, cetyltrimethylammonium bromide, tetrabutylphosphonium bromide, hexaethylguanidinium chloride, and mixtures thereof.

18. The method of claim 16 wherein the catalyst is at least one tertiary amine.

19. The method of claim 1 wherein the reaction of polyester intermediate with phosgene is performed in the presence of at least a portion of polyester intermediate possessing end-groups which are not reactive with phosgene.

20. The method of claim 1 wherein the reaction of polyester intermediate with phosgene further comprises at least one dihydroxy-substituted aromatic hydrocarbon moiety different from the hydroxy-terminated polyester intermediate.

21. The method of claim 20 wherein at least one dihydroxy-substituted aromatic hydrocarbon moiety different from the hydroxy-terminated polyester intermediate is the same as at least one dihydroxy-substituted aromatic hydrocarbon moiety employed in the synthesis of polyester intermediate.

22. The method of claim 20 wherein at least one dihydroxy-substituted aromatic hydrocarbon moiety is different from any dihydroxy-substituted aromatic hydrocarbon moiety employed in the synthesis of polyester intermediate.

23. The method of claim 22 wherein the dihydroxy-substituted aromatic hydrocarbon moiety is bisphenol A.

24. The method of claim 20 wherein at least one polycarbonate is prepared in the presence of or simultaneously with the copolyestercarbonate.

25. The method of claim 24 wherein the dihydroxy-substituted aromatic hydrocarbon moiety is bisphenol A.

26. The method of claim 20 wherein the reaction of the polyester intermediate with phosgene is conducted in the presence of a mixture of dihydroxy-substituted aromatic hydrocarbon moieties, at least one of which is the same as and at least one of which is different from any dihydroxy-substituted aromatic hydrocarbon moiety employed in polyester intermediate synthesis.

27. The method of claim 26 wherein at least one member of the mixture of dihydroxy-substituted aromatic hydrocarbon moieties consists of bisphenol A.

28. The method of claim 1 wherein base and phosgene are added simultaneously to the reaction mixture at a substantially constant molar ratio of base to phosgene for a time period of at least 80% of the total amount of phosgene added.

29. The method of claim 1 wherein base and phosgene are added simultaneously to the reaction mixture at a substantially constant molar ratio of base to phosgene for a time period of greater than 98% of the total amount of phosgene added.

30. The method of claim 1 wherein base and phosgene are added simultaneously to the reaction mixture at a substantially constant molar ratio of base to phosgene for a time period of essentially 100% of the total amount of phosgene added.

31. The method of claim 1 wherein the stoichiometric ratio of base to phosgene is in a range of between about 1.8 and about 2.5 mole base per mole phosgene.

32. The method of claim 1 wherein the addition rates of both aqueous base and phosgene are varied during the addition process while the molar ratio is substantially constant.

33. The method of claim 1 wherein the copolyestercarbonate is recovered from the reaction mixture.

34. A method for preparing a block copolyestercarbonate comprising chain members derived from at least one 1,3-dihydroxybenzene moiety and at least one aromatic dicarboxylic acid moiety, said polymer being substantially free of anhydride linkages linking at least two mers of the polyester chain segments, comprising the steps of:

(a) preparing a hydroxy-terminated polyester intermediate comprising structural units derived from at least one 1,3-dihydroxybenzene moiety and at least one aromatic dicarboxylic acid moiety; and (b) conducting a reaction of the polyester intermediate with phosgene in a reaction mixture comprising water, a substantially water-immiscible organic solvent, and a base, wherein base and phosgene are added simultaneously to the reaction mixture at a substantially constant molar ratio of base to phosgene for a time period of at least about 60% of the total amount of phosgene added.

35. The method of claim 34 wherein the 1,3-dihydroxybenzene moiety is at least one member selected from the group consisting of compounds of the formula:

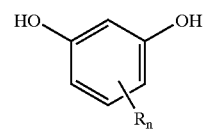

wherein R is at least one of $C_{1-12}$ alkyl or halogen, and n is 0–3.

36. The method of claim 35 wherein the 1,3-dihydroxybenzene moiety is selected from the group consisting of unsubstituted resorcinol, 2-methyl resorcinol, and mixtures thereof.

37. The method of claim 36 wherein the 1,3-dihydroxybenzene moiety is unsubstituted resorcinol.

38. The method of claim 34 wherein the aromatic dicarboxylic acid moiety comprises an aromatic dicarboxylic acid dichloride or an aromatic dicarboxylic acid diester.

39. The method of claim 38 wherein the aromatic dicarboxylic acid moiety is an aromatic dicarboxylic acid dichloride selected from the group consisting of isophthaloyl dichloride, terephthaloyl dichloride, naphthalene-2,6-dicarboxylic acid dichloride, and mixtures thereof.

40. The method of claim 39 further comprising at least one aliphatic dicarboxylic acid dichloride.

41. The method of claim 40 wherein the aliphatic dicarboxylic acid dichloride is selected from the group consisting of sebacoyl chloride and cyclohexane-1,4-dicarboxylic acid dichloride.

42. The method of claim 39 wherein the dicarboxylic acid dichloride is a mixture of isophthaloyl dichloride and terephthaloyl dichloride.

43. The method of claim 42 wherein the ratio of isophthaloyl dichloride to terephthaloyl dichloride is about 0.25–4.0:1.

44. The method of claim 42 wherein the ratio of isophthaloyl dichloride to terephthaloyl dichloride is about 0.67–1.5:1.

45. The method of claim 38 wherein the aromatic dicarboxylic acid moiety is an aromatic dicarboxylic acid diester selected from the group consisting of diphenyl isophthalate, diphenyl terephthalate, diphenyl naphthalene-2,6-dicarboxylate, and mixtures thereof.

46. The method of claim 45 further comprising at least one aliphatic dicarboxylic acid diester.

47. The method of claim 46 wherein the aliphatic dicarboxylic acid diester is selected from the group consisting of diphenyl sebacate and diphenyl cyclohexane-1,4-dicarboxylate.

48. The method of claim 45 wherein the dicarboxylic acid diester is a mixture of diphenyl isophthalate and diphenyl terephthalate.

49. The method of claim 48 wherein the ratio of diphenyl isophthalate to diphenyl terephthalate is about 0.25–4.0:1.

50. The method of claim 48 wherein the ratio of diphenyl isophthalate to diphenyl terephthalate is about 0.67–1.5:1.

51. The method of claim 34 wherein the base is at least one of an alkali metal hydroxide, an alkaline earth hydroxide, or an alkaline earth oxide.

52. The method of claim 51 wherein the base is aqueous sodium hydroxide.

53. The method of claim 34 wherein the organic solvent is selected from the group consisting of chloroform, chlorobenzene, dichloromethane, 1,2-dichloroethane, dichlorobenzene, toluene, xylene, trimethylbenzene, and mixtures thereof.

54. The method of claim 34 wherein the reaction of polyester intermediate with phosgene further comprises at least one catalyst selected from the group consisting of tertiary amines, quaternary ammonium salts, quaternary phosphonium salts, hexaalkylguanidinium salts, and mixtures thereof.

55. The method of claim 54 wherein the catalyst is selected from the group consisting of triethylamine, dimethylbutyl amine, N-ethylpiperidine, N-methylpiperidine, diisopropylethylamine, 2,2,6,6-tetramethylpiperidine, tetrapropylammonium bromide, tetrabutylammonium bromide, tetrabutylammonium chloride, methyltributylammonium chloride, benzyltriethylammonium chloride, cetyltrimethylammonium bromide, tetrabutylphosphonium bromide, hexaethylguanidinium chloride, and mixtures thereof.

56. The method of claim 54 wherein the catalyst is at least one tertiary amine.

57. The method of claim 34 wherein the reaction of polyester intermediate with phosgene is performed in the presence of at least a portion of polyester intermediate possessing end-groups which are not reactive with phosgene.

58. The method of claim 34 wherein the reaction of polyester intermediate with phosgene further comprises at least one dihydroxy-substituted aromatic hydrocarbon moiety different from the hydroxy-terminated polyester intermediate.

59. The method of claim 58 wherein at least one dihydroxy-substituted aromatic hydrocarbon moiety different from the hydroxy-terminated polyester intermediate is the same as at least one 1,3-dihydroxybenzene moiety employed in the synthesis of polyester intermediate.

60. The method of claim 59 wherein the dihydroxy-substituted aromatic hydrocarbon moiety is unsubstituted resorcinol.

61. The method of claim 58 wherein at least one dihydroxy-substituted aromatic hydrocarbon moiety is different from any 1,3-dihydroxybenzene moiety employed in the synthesis of polyester intermediate.

62. The method of claim 61 wherein the dihydroxy-substituted aromatic hydrocarbon moiety is bisphenol A.

63. The method of claim 58 wherein at least one polycarbonate is prepared in the presence of or simultaneously with the copolyestercarbonate.

64. She method of claim 63 wherein the dihydroxy-substituted aromatic hydrocarbon moiety is bisphenol A.

65. The method of claim 58 wherein the reaction of the polyester intermediate with phosgene is conducted in the presence of a mixture of dihydroxy-substituted aromatic hydrocarbon moieties, at least one of which is the same as and at least one of which is different from any 1,3-dihydroxybenzene moiety employed in polyester intermediate synthesis.

66. The method of claim 65 wherein the mixture of dihydroxy-substituted aromatic hydrocarbon moieties consists of unsubstituted resorcinol and bisphenol A.

67. The method of claim 34 wherein base and phosgene are added simultaneously to the reaction mixture at a substantially constant molar ratio of base to phosgene for a time period of at least 80% of the total amount of phosgene added.

68. The method of claim 34 wherein base and phosgene are added simultaneously to the reaction mixture at a substantially constant molar ratio of base to phosgene for a time period of greater than 98% of the total amount of phosgene added.

69. The method of claim 34 wherein base and phosgene are added simultaneously to the reaction mixture at a substantially constant molar ratio of base to phosgene for a time period of essentially 100% of the total amount of phosgene added.

70. The method of claim 34 wherein the stoichiometric ratio of base to phosgene is in a range of between about 1.8 and about 2.5 mole base per mole phosgene.

71. Then method of claim 34 wherein the addition rates of both aqueous base and phosgene are varied during the addition process while the molar ratio is substantially constant.

72. The method of claim 34 wherein the copolyestercarbonate is recovered from the reaction mixture.

73. An interfacial method for preparing a block copolyestercarbonate comprising polyester block segments with chain members derived from a mixture of terephthaloyl dichloride and isophthaloyl dichloride in a molar ratio in a range of about 0.4–2.5:1 and unsubstituted resorcinol, and polycarbonate segments with chain members derived from at least one of unsubstituted resorcinol and bisphenol A;

wherein said copolyestercarbonate is substantially free of anhydride linkages linking at least two mers of the polyester blocks, comprising the steps of:
(a) preparing a hydroxy-terminated polyester intermediate having a degree of polymerization of at least 4; and
(b) conducting a reaction of the polyester intermediate with phosgene in a reaction mixture comprising water, dichloromethane, at least one catalyst, and a base, wherein base and phosgene are added simultaneously to the reaction mixture at a substantially constant molar ratio of base to phosgene for a time period of at least about 60% of the total amount of phosgene added.

74. The method of claim 73 wherein polyester intermediate synthesis and copolyestercarbonate synthesis are both conducted in a two-phase system including an aqueous phase and dichloromethane.

75. The method of claim 74 wherein the polyester intermediate is not isolated from solution before conducting a reaction of said polyester intermediate with phosgene.

76. The method of claim 73 wherein the reaction of polyester intermediate with phosgene is performed in the presence of at least a portion of polyester intermediate possessing end-groups which are not reactive with phosgene.

77. The method of claim 73 wherein at least one polycarbonate is prepared in the presence of or simultaneously with the copolyestercarbonate.

78. The method of claim 77 wherein the polycarbonate comprises chain members derived from bisphenol A.

79. The method of claim 73 wherein the stoichiometric ratio of base to phosgene is in a range of between about 1.8 and about 2.5 mole base per mole phosgene.

80. The method of claim 73 wherein the copolyestercarbonate is recovered from the reaction mixture.

81. An interfacial method for preparing a block copolyestercarbonate comprising polyester block segments with chain members derived from a mixture of terephthaloyl dichloride and isophthaloyl dichloride in a molar ratio in a range of about 0.4–2.5:1 and unsubstituted resorcinol, and polycarbonate segments with chain members derived from at least one of unsubstituted resorcinol and bisphenol A;

wherein said copolyestercarbonate is substantially free of anhydride linkages linking at least two mers of the polyester blocks, comprising the steps of:
(a) combining at least one 1,3-dihydroxybenzene moiety and at least one catalyst in a mixture of water and at least one organic solvent substantially immiscible with water;
(b) adding to the mixture from (a) a controlled stoichiometric ratio of at least one acid chloride and at least one base while maintaining the pH between about 5 and about 8.5, and (c) adjusting the pH of the reaction mixture to a value in the range of about 7 and about 9 following complete addition of acid chloride, and stirring the reaction mixture for a time sufficient to destroy any anhydride linkages in the polymer chain, thus preparing a polyester intermediate; and (d) conducting a reaction of the polyester intermediate with phosgene in a reaction mixture comprising water, dichloromethane, at least one catalyst, and a base, wherein base and phosgene are added simultaneously to the reaction mixture at a substantially constant molar ratio of base to phosgene in a range of between about 1.8 and about 2.5 mole base per mole phosgene during the addition process.

82. The method of claim 81 wherein polyester intermediate synthesis and copolyestercarbonate synthesis are both conducted in a two-phase system including an aqueous phase and dichloromethane.

83. The method of claim 81 wherein the polyester intermediate is not isolated from solution before conducting a reaction of said polyester intermediate with phosgene.

84. The method of claim 81 wherein the reaction of polyester intermediate with phosgene is performed in the presence of at least a portion of polyester intermediate possessing end-groups which are not reactive with phosgene.

85. The method of claim 81 wherein at least one polycarbonate is prepared in the presence of or simultaneously with the copolyestercarbonate.

86. The method of claim 85 wherein the polycarbonate comprises chain members derived from bisphenol A.

87. The method of claim 81 wherein the copolyestercarbonate is recovered from the reaction mixture.

88. A method for preparing a block copolyestercarbonate substantially free of anhydride linkages linking at least two mers of the polymer chain, which comprises the steps of:

(a) preparing a hydroxy-terminated polyester intermediate in a molten reaction mixture comprising at least one 1,3-dihydroxybenzene moiety and at least one aromatic dicarboxylic acid diarylester under transesterification conditions, said polyester intermediate having a degree of polymerization of at least 4; recovering the copolyestercarbonate from the reaction mixture; and (b) conducting a reaction of the polyester intermediate with phosgene in a reaction mixture comprising water, dichloromethane, at least one catalyst, and a base, wherein base and phosgene are added simultaneously to the reaction mixture at substantially constant molar ratio of base to phosgene.

89. The method of claim 88 wherein the dicarboxylic acid diester is a mixture of diphenyl isophthalate and diphenyl terephthalate.

90. The method of claim 88 wherein the ratio of diphenyl isophthalate to diphenyl terephthalate is about 0.25–4.0:1.

91. The method of claim 88 wherein the ratio of diphenyl isophthalate to diphenyl terephthalate is about 0.67–1.5:1.

92. The method of claim 88 wherein the stoichiometric ratio of base to phosgene is in a range of between about 1.8 and about 2.5 mole base per mole phosgene.

93. The method of claim 88 wherein at least one polycarbonate is prepared in the presence of or simultaneously with the copolyestercarbonate.

94. The method of claim 93 wherein the polycarbonate comprises chain members derived from bisphenol A.

95. The method of claim 88 wherein the copolyestercarbonate is recovered from the reaction mixture.

* * * * *

UNITED STATES PATENT AND TRADEMARK OFFICE
CERTIFICATE OF CORRECTION

PATENT NO. : 6,812,320 B2
DATED : November 2, 2004
INVENTOR(S) : Silva et al.

It is certified that error appears in the above-identified patent and that said Letters Patent is hereby corrected as shown below:

Column 2,
Line 14, before "These copolymers" delete "00/26275" and insert therefor -- 00/26274 --

Column 9,
Line 4, after "species." delete "W1hen" and insert therefor -- When --

Column 13,
Line 47, after "levels of" delete "soluble" and insert therefor -- insoluble --

Column 14,
Line 19, after "n is" delete "0-3),", and insert therefor -- 0-3, --
Line 20, after "divalent" delete "aromatic;.c" and insert therefor -- aromatic --; and after "radical," delete "R" and insert therefor -- $R^2$ --

Column 20,
Line 23, after "course" delete ","
Line 24, after "chlorides" delete "and/of" and insert therefor -- and/or --
Line 62, after "methane" delete "." and insert therefor -- , --

Column 21,
Line 35, after "embodiment of" delete "tho" and insert therefor -- the --

Column 22,
Line 22, after "4'-diaryldicarboxylate," delete "diphenyl ketone" and insert therefor -- diphenylketone --

Column 24,
Line 26, after "from" delete "ally" and insert therefor -- any --
Line 54, after "unreacted" delete "1.3-dihydroxybenzene" and insert therefor -- 1,3-dihydroxybenzene --

Column 35,
Line 25, after "dishes;" delete "(coated" and insert therefor -- coated --

UNITED STATES PATENT AND TRADEMARK OFFICE
CERTIFICATE OF CORRECTION

PATENT NO.   : 6,812,320 B2
DATED        : November 2, 2004
INVENTOR(S)  : Silva et al.

It is certified that error appears in the above-identified patent and that said Letters Patent is hereby corrected as shown below:

Column 39,
Line 4, after "dicarboxylic" and insert therefor -- acid --

Signed and Sealed this

Twenty-second Day of March, 2005

JON W. DUDAS
*Director of the United States Patent and Trademark Office*